(12) United States Patent
Sarkar et al.

(10) Patent No.: US 9,365,128 B2
(45) Date of Patent: Jun. 14, 2016

(54) SYSTEMS AND METHODS FOR AUTOMATIC CONNECTION AND CHARGING OF AN ELECTRIC VEHICLE AT A CHARGING STATION

(75) Inventors: Reuben Sarkar, Denver, CO (US); Michael Alan Finnern, Evergreen, CO (US); Michael Walker, Thornton, CO (US)

(73) Assignee: Proterra Inc., Greenville, SC (US)

( * ) Notice: Subject to any disclaimer, the term of this patent is extended or adjusted under 35 U.S.C. 154(b) by 673 days.

(21) Appl. No.: 13/643,541

(22) PCT Filed: Apr. 26, 2011

(86) PCT No.: PCT/US2011/033915
§ 371 (c)(1),
(2), (4) Date: Apr. 11, 2013

(87) PCT Pub. No.: WO2011/139680
PCT Pub. Date: Nov. 10, 2011

(65) Prior Publication Data
US 2013/0193918 A1 Aug. 1, 2013

Related U.S. Application Data

(60) Provisional application No. 61/328,152, filed on Apr. 26, 2010.

(51) Int. Cl.
*H02J 7/00* (2006.01)
*H02J 7/14* (2006.01)
(Continued)

(52) U.S. Cl.
CPC ............... *B60L 11/1833* (2013.01); *B60L 3/04* (2013.01); *B60L 3/12* (2013.01); *B60L 7/18* (2013.01); *B60L 11/005* (2013.01); *B60L 11/185* (2013.01); *B60L 11/1816* (2013.01); *B60L 11/1837* (2013.01); *B60L 11/1846* (2013.01); *B60L 11/1877* (2013.01); *B60L 11/1887* (2013.01); *B60L 15/2009* (2013.01); *H02J 7/0027* (2013.01); *H02J 7/0045* (2013.01); *H02J 7/027* (2013.01); *B60L 11/1818* (2013.01); *B60L 2200/18* (2013.01); *B60L 2230/22* (2013.01); *B60L 2230/24* (2013.01); *B60L 2230/28* (2013.01); *B60L 2230/30* (2013.01); *B60L 2230/32* (2013.01); *B60L 2240/12* (2013.01); *B60L 2240/421* (2013.01); *B60L 2240/545* (2013.01); *B60L 2240/549* (2013.01); *B60L 2240/72* (2013.01); *B60L 2240/80* (2013.01); *B60L 2250/10* (2013.01); *B60L 2250/16* (2013.01); *Y02T 10/645* (2013.01); *Y02T 10/705* (2013.01); *Y02T 10/7022* (2013.01);
(Continued)

(58) Field of Classification Search
USPC ......... 320/107, 108, 109, 137, 104, 149, 150; 307/9.1, 104, 10, 80
See application file for complete search history.

(56) References Cited

U.S. PATENT DOCUMENTS 5,461,298 A  10/1995  Lara et al.
5,821,731 A  10/1998  Kuki et al.
(Continued)

*Primary Examiner* — Alexis A Boateng
(74) *Attorney, Agent, or Firm* — Bookoff McAndrews, PLLC

(57) ABSTRACT

The invention provides systems and methods for connecting an electric or hybrid electric vehicle to a charging station. Automated charging and docking processes may be provided. In some embodiments, a vehicle arrival and position may be detected. The vehicle may be charged with a charging arm and some automated vehicle positioning may occur. The vehicle may be charged and released. Fault detection may occur.

12 Claims, 15 Drawing Sheets

(51) Int. Cl.
    *B60L 11/18* (2006.01)
    *B60L 3/04* (2006.01)
    *B60L 3/12* (2006.01)
    *B60L 7/18* (2006.01)
    *B60L 11/00* (2006.01)
    *B60L 15/20* (2006.01)
    *H02J 7/02* (2016.01)

(52) U.S. Cl.
    CPC .......... *Y02T10/7055* (2013.01); *Y02T 10/7088* (2013.01); *Y02T 10/72* (2013.01); *Y02T 10/7275* (2013.01); *Y02T 10/7291* (2013.01); *Y02T 90/121* (2013.01); *Y02T 90/125* (2013.01); *Y02T 90/128* (2013.01); *Y02T 90/14* (2013.01); *Y02T 90/163* (2013.01); *Y02T 90/169* (2013.01); *Y02T 90/34* (2013.01); *Y04S 30/14* (2013.01)

(56) References Cited

U.S. PATENT DOCUMENTS

| | | | |
|---|---|---|---|
| 5,847,537 A | 12/1998 | Parmley, Sr. | |
| 6,014,597 A * | 1/2000 | Kochanneck | 701/22 |
| 6,157,162 A * | 12/2000 | Hayashi et al. | 320/104 |
| 7,999,506 B1 * | 8/2011 | Hollar | B60L 11/1818 320/104 |
| 8,025,526 B1 * | 9/2011 | Tormey et al. | 439/528 |
| 8,369,989 B2 * | 2/2013 | Sip | 700/245 |
| 8,489,315 B2 * | 7/2013 | Yamamoto | 701/123 |
| 2009/0079388 A1 * | 3/2009 | Reddy | 320/109 |
| 2009/0224724 A1 * | 9/2009 | Ma | B60L 11/14 320/109 |
| 2009/0320715 A1 * | 12/2009 | Morita et al. | 105/51 |
| 2010/0001687 A1 * | 1/2010 | Watanabe | B60L 3/12 320/109 |
| 2010/0039067 A1 * | 2/2010 | Hill | B60L 5/42 320/109 |
| 2010/0117596 A1 * | 5/2010 | Cook | B60L 11/182 320/108 |
| 2011/0181241 A1 * | 7/2011 | Badger | 320/109 |
| 2011/0187317 A1 * | 8/2011 | Mitake | B60L 5/005 320/108 |
| 2011/0285349 A1 * | 11/2011 | Widmer et al. | 320/108 |
| 2013/0076902 A1 * | 3/2013 | Gao et al. | 348/148 |
| 2013/0337669 A1 * | 12/2013 | Najera et al. | 439/133 |

\* cited by examiner

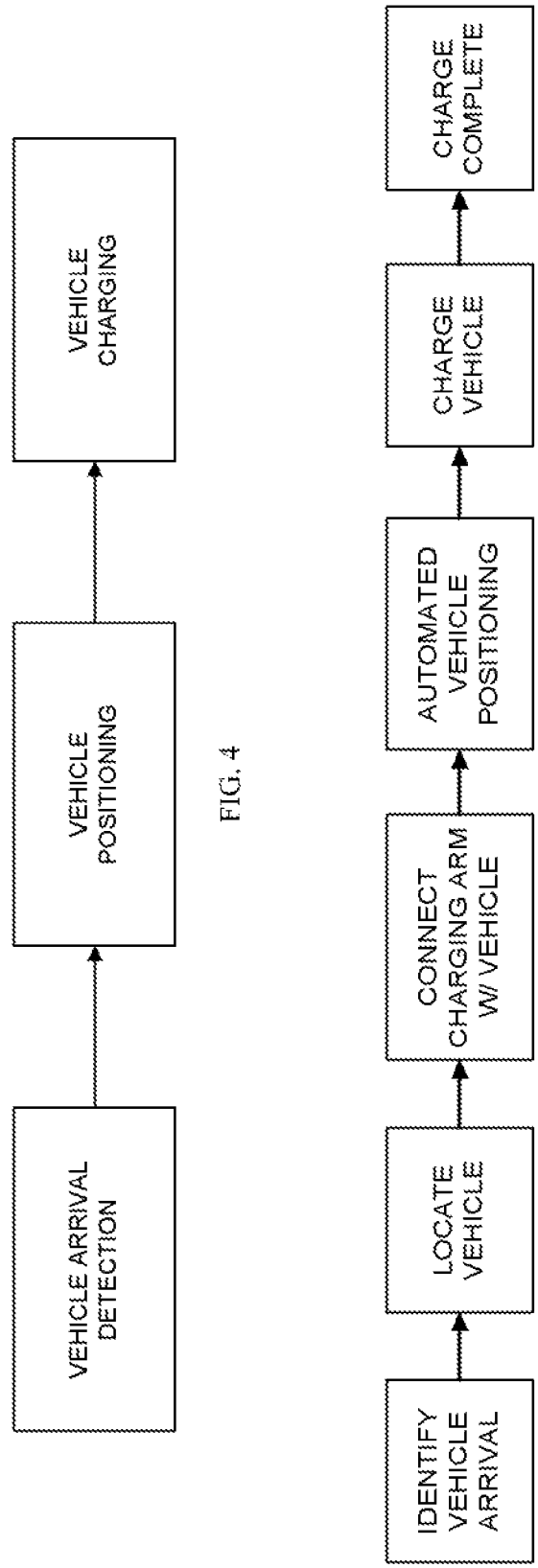

|  | BUS | CHARGE STATION |
|---|---|---|
| Step | Controls Overview |  |
| A | Vehicle controller to look for CAN messages from bluetooth | Wait for CAN traffic from bus |
|  |  | Perform periodic air pressure test |
| B | Start main routine upon receipt of charge station CAN msg | Check for air pressure |
|  | Set charger readiness flag upon receiving good comm from charge station | Check for ok from charger |
|  | DISPLAY which charge station to go to or current readiness of station? | Send ok to charge flag |
|  | DISPLAY precise speed of bus to driver on display (x.x mph) | Check for ok from RFID |
|  | Apply filter to charge station CAN msgs based on which side of charger (using RFID) | check for arm position up so that ultrasonic sensor reading is accurate |
|  | DISPLAY that connection has been made as soon as possible. Driver will need training to know to stop by themselves if no connection signal |  |
| C | No control info for initial L/R placement of bus |  |
|  | DISPLAY SLOW DOWN if driver is going too fast, bus will not charge |  |
| D-E | Monitor driver speed, disallow docking if speed too high | RFID will either come through ethernet to CAN gateway or potentially just from reader outputs |
|  | DISPLAY bus speed and whether or not auto control take place |  |
|  | Wait for CAN message indicating RFID has detected bus. |  |
|  | Ensure bus is in 1st gear |  |
|  | Upon receipt of RFID CAN message begin vehicle speed limiting |  |
|  | Ramp vehicle speed to 3mph |  |
|  | Wait for signal from ultrasonic sensor |  |
|  | Potentially disallow charging if ride-height is not at nominal? Better to be able to accommodate. Maybe use height deltas |  |
|  | DISPLAY, bus will stop in position |  |

FIG. 7A

|  | BUS | CHARGE STATION |
|---|---|---|
| Step | Controls Overview |  |
| F-G | CAN message from ultrasonic sensor indicated bus has passed under arm | Check for proper signal from ultrasonic sensors (must be within a window allowing for ride height difference) |
|  | begin distance integration to reset point 1 (front of air conditioning unit) |  |
|  | watchdog time to reset point 1 based on avg speed |  |
|  | reset points are specific measurements from the ultrasonic sensor |  |
|  | Store time to reset point 1 in a register and check against bounds |  |
|  | Continue integration from front of bus if time to reset point 1 is out of bounds |  |
|  | Reset integration if point 1 if in bounds |  |
|  | Begin distance integration to reset point 2 (back of air conditioning unit) |  |
|  | watchdog time to reset point 2 based on avg speed |  |
|  | Store time to reset point 2 in a register and check against bounds |  |
|  | Check time to initial integration as a potential back-up |  |
|  | Wait for final location point 3 (portion of ramp that is lower by several inches in) |  |
|  | Time to this point must be carefully bounded. |  |
|  | Incorrect Left and Right location will look like no slot to the measurement sensor |  |
|  |  |  |
| H | If final point measurement and time are both ok, begin bus stop routine |  |
|  | disable doors unless parking brake is set incase driver stop bus too soon |  |
|  | if driver stops too soon, DISPLAY, to charge bus, release brake and pull ahead slowly when safe. Bus will automatically stop in the correct position |  |
| J | Ramp bus speed to zero using regen (this should be done in as short a time as comfortably possible) |  |
|  | Wait for bus to reach zero speed |  |
|  | shift to neutral |  |
|  | apply rear door brake interlock |  |
|  | DISPLAY waiting for charge arm to lower, bus will move ahead automatically |  |

FIG 7B

|   | BUS | CHARGE STATION |
|---|---|---|
| Step | Controls Overview | |
| K | begin arm lower sub-routine | actuate arm down solenoid |
|   | send signal that bus is in position | send arm moving, down and head down switch signals |
|   | lower arm | |
|   | check for arm movement by loss of home position | |
|   | check for arm cylinder down and then wait for head down microswitches | |
| L | once all switches are good, begin final bus movement sub-routine | |
|   | | |

FIG. 7C

|   | BUS | CHARGE STATION |
|---|---|---|
| Step | Controls Overview | |
| M | DISPLAY bus will move forward automatically and then stop to charge, release brake pedal. | |
|   | check for driver off pedal | |
|   | send motor tq signal as low as possible to move bus slowly and smoothly | |
|   | begin distance integration as soon as bus moves to use a watchdog | |
|   | wait for pilot signal to indicate head in position | |
| N | Autostop bus once in position using the same procedure as step J | |
| P | Regen bus to zero | |
|   | shift transmission to natural | |
|   | apply rear door brake interlock | |
|   | DISPLAY set park brake to allow doors to open and bus to charge | |
| Q | check for parking brake | |
| R | allow doors to open | |
|   | DISPLAY bus charging | Check for pilot signal from charger |
|   | | |

FIG. 7D

|   | BUS | CHARGE STATION |
|---|---|---|
| Step | Controls Overview | |
| S | Begin charging sub-routine | |
|   | send signal to extend ground brush | extend grounding brush air cylinder |
|   | wait for ground brush extended | |
|   | send ac signal or tone to ensure ground is connected? | |
|   | Signal charge brushes to extend | extend charging brush air cylinders |
| T | wait for all 10 brushes to extend | |
|   |   | wait for charger to report bus bat voltage |
| U | Ok to start charging | charger to report time to charge? |
| W | DISPLAY charging, time to complete or percent full? | Close distribution box contactors |
|   | Stop current flow if loss of pilot, temp switches, report from BMS, report from charger, | Continuously monitor temp switches |

FIG. 7E

|   | BUS | CHARGE STATION |
|---|---|---|
| Step | Controls Overview | |
| Y | Log charge metrics when charge complete (time, SOC init, SOC final, total power, peak current, faults) | |
| Z | Begin charge done sub-routine | |
|   | stop charging | open distribution box contactors |
|   | signal release brushes | release charge brushes |
|   | wait for all ten brushes to get home | release ground |
|   | signal release ground | raise arm |
|   | wait for ground to get home | ensure arm seats home for next time |
|   | signal raise arm | cycle brushes as a preventative maintenance action? |
| AA | wait for loss of head micro switches before allowing driver to move | |
| BB | Release rear-door brake interlock and allow movement | |
| CC | DISPLAY charge complete, release parking brake and select gear to drive away | |
|   | DISPLAY SOC or full fuel gauge? | |

FIG. 7F

| Step | BUS | CHARGE STATION |
|---|---|---|
| | Controls Overview | |
| FAULT | fault sub-routine | |
| | signal charger to stop | |
| | release brushes | |
| | disable rear-door brake interlock | |
| | allow bus movement if driver uses pedals and releases brake | |
| | signal arm up | |
| | log fault code | |
| | DISPLAY Charging stopped, contact support (number or normal trouble routine) | |
| | | |
| | | |
| | REQUIRED DISPLAY MESSAGES | |
| | Charging station 1 and 2 ready…or not ready, etc. | |
| | Communication established, please drive slow to 5mph before charge station or auto charge will not take place(tone) | |
| | Accurate speed (x.x mph) (tone if too fast) | |
| | Speed ok, charging will take place, always be prepared to stop if required | |
| | Align painted line with steering column | |
| | SLOW DOWN, too fast , bus will not charge | |
| | To charge bus, release brake and pull ahead slowly when safe. Bus will automatically stop | |
| | Approaching initial stop position, bus will automatically stop, release brake if safe. (tone that gets quicker as bus moves closer) | |
| | Waiting for charge arm to lower, bus will move ahead automatically to charge. Release brake if safe | |
| | Connected, set parking brake to start charge and allow doors to open | |
| | Bus charging (battery SOC gauge) | |
| | FAULT, bus not charged, contact maintenance | |
| | Charging complete, select drive and release parking brake when ready | |
| | Bus out of position, drive around and try and again, do not backup | |
| | password access: diagnostic screen indicating battery specifics and fault codes | |

FIG. 7G

SYSTEMS AND METHODS FOR AUTOMATIC CONNECTION AND CHARGING OF AN ELECTRIC VEHICLE AT A CHARGING STATION

CROSS-REFERENCE

This application claims the benefit of U.S. Provisional Application No. 61/328,152, filed Apr. 26, 2010, which application is incorporated herein by reference in its entirety.

BACKGROUND OF THE INVENTION

Heavy duty battery electric, vehicles can require relatively frequent charging to operate in normal service. Frequent charging at predetermined chanting station locations enables energy storage systems to be sized with more certainty leading to reduce size, mass, and cost of systems. That required frequency of charging means that manual connection, such as physically plugging the vehicle in, to a charger is not acceptable. Traditionally, manually connecting the vehicle requires the driver park and then carry high voltage cables to plug in the vehicle. In a transit center distances to charging station equipment could be quite far from the bus leading to long lengths of heavy gage high voltage cable to reach the vehicle. Not only is this a distraction, it is not typical job task for drivers.

Therefore, a need exists for improved systems and methods for connecting an electric vehicle to a charging station. A further need exists for systems and methods that provide a control strategy for automatically providing such a connection and for subsequent charging of on-board vehicle batteries.

SUMMARY OF THE INVENTION

The invention provides systems and methods for connecting an electric or hybrid electric vehicle to a charging station. The invention further provides a control strategy for subsequent charging of onboard batteries. Various aspects of the invention described herein may be applied to any of the particular applications set forth below or for any other types of vehicles. The invention may be applied as a standalone system or method, or as part of an integrated transportation system, such as a bus system or other public transportation system. It shall be understood that different aspects of the invention can be appreciated individually, collectively, or in combination with each other.

In accordance with some aspects of the invention, absolute reliability and repeatability of the docking and charging process may be desired to ensure continued operation. Due to the relatively harsh environment in which heavy duty vehicles operate, both the docking and battery charging process itself may preferably be capable of handling a wide range of system variability and conditions.

Some specific specifications that may be desirable may include the following. Charging would preferably be performed on route to prevent having to remove vehicle from service and drive to a special charging station, thereby reducing duty cycle. On route charging station preferably allows different, non battery electric vehicles to pass through the station while correctly identifying when battery electric vehicles are in the terminal and require changing. For example, a compressed natural gas (CNG) or diesel powered vehicle may be allowed to use the same terminal as the battery electric vehicle. This means the docking and charging equipment preferably remains unobtrusive until required for use.

A vehicle's approach and dock with a charger is preferably safe, reliable and repeatable. A vehicle connection process may advantageously have reduced or minimal driver interaction and limited change to driver behavior.

An aspect of the invention may be to automate all or nearly all of the entire charging process for an electric vehicle. The vehicle may connect (dock) automatically with the charge station and the battery charge process may take place automatically. This automated process ensures a proper charge every time and may allow for continuous, efficient operation of the vehicle.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 4 provides a high level depiction of an automated charging method.

FIG. 5 provides a depiction of an automated charging method in accordance with an embodiment of the invention.

FIG. 7A-G provides a table describing the steps for an automatic docking and charging procedure.

DETAILED DESCRIPTION OF THE INVENTION

Figure 1:
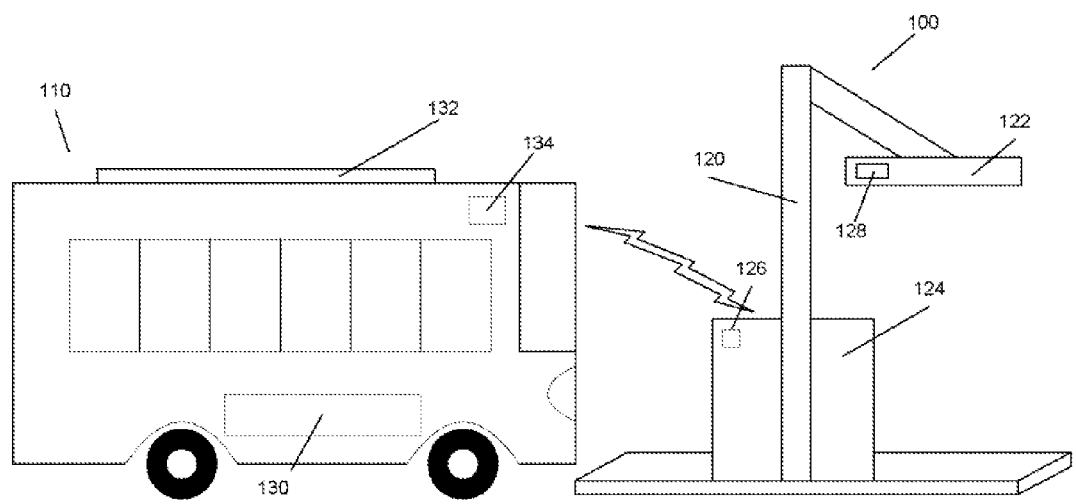
FIG. 1 shows an example of a vehicle approaching a charging station.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides for systems and methods for connecting an electric vehicle to a charging station. The invention further comprises systems and methods for charging the electric vehicle at the charging station. One aspect of the invention provides for automated connection between the vehicle and the charging station for charging of on-board vehicle batteries. The charging station may be used to transfer power to any electric vehicle, hybrid electric vehicle, or any other vehicle that may include a propulsion power source, such as a battery, ultra-capacitor, or any other energy storage system. In some embodiments, an electrically powered vehicle may be a heavy duty vehicle, such as a bus or truck.

For example, electrical vehicles powered by the system may include a transit bus, a school bus, a delivery van, a shuttle bus, a tractor trailer, a class 5 truck (weighing 16,001-19,500 lbs., two-axle, six-tire single unit), a class 6 truck neighing 19,501-26,000 lbs., three-axle single unit), a class 7 truck (weighing 26,001-33,000 lbs., four or more axle single unit), a class 8 truck (weighing 33,000 lbs. and over, four or less axle single trailer), a vehicle with a GVWR weighing over 14,000 pounds, a vehicle with a cargo to driver mass ratio of 15:1 or greater, a vehicle with six or more tires, a vehicle with three or more axles, or any other type of high occupancy or heavy-duty vehicle. In some embodiments, a charging station may charge any other electric vehicle, including passenger vehicles. Any discussion herein of electric vehicles or electrically powered vehicles may refer to any type of vehicle discussed and vice versa.

System

An example of automatic docking and charging of a battery electric vehicle involves an urban bus operating on a fixed, cyclical route. The bus may have on-board batteries to store enough energy to make one or more complete cycles of its assigned route, or legs of its assigned route. One or more of the stops on the route may be at a battery charging station. While the driver takes his normal break the vehicle is automatically docked and the batteries charged for the next route cycle. A charging station may or may not be integrated with a passenger stop. Upon final vehicle positioning relative to the charger (vehicle docked), the doors may be opened and passengers are allowed to enter and exit. The control system may be provided such that little to no additional driver interaction, beyond typical bus driving skills, is required to dock and charge the vehicle. Preferably, each step or many of the steps of the process may be automatic and error tolerant.

This process may result in a system suitable for placement at a typical transit central station without the need for a special, battery electric bus charging station only bus stop.

In some embodiments of the invention, the charging station can comprise a charging connection, such as a charging chassis or overhang, suspended from a charging mount for establishing an electrical connection between the charging station and the electrically powered vehicle. A charging connection may have any configuration, which may include a charging arm or base that may be provided from a side or base of a charging station. The charging connection may have any orientation, which may include a downward hanging orientation, an upward extending orientation, a horizontal extending orientation, an angled orientation, or any combination thereof. The charging connection can comprise a positioning device for controlling the position or orientation of the charging connection. A power source may be provided to or at the charging station. In some instances, the power source may be a grid utility, battery, capacitor, ultracapacitor, fuel cell, generator, renewable energy source (e.g., solar, wind, hydrodynamic geothermal, etc.), or any other power source. The power source may be in electrical communication with the charging connection.

Another aspect of the invention provides for an electric vehicle comprising contact plates for establishing an electrical connection to a charging station. The contact plates can be positioned on a top surface of the electric vehicle and be positioned in a direction that is relatively parallel to a direction of vehicle movement. For example, the contact plates may be spaced apart on the top surface of the electric vehicle. Alternatively, the contact plates may be provided on a side of the vehicle, or under the vehicle, or anywhere along a surface of the vehicle. The contact plates may be exposed on the surface of a vehicle, or may be provided beneath a cover. The electric vehicle may have one or more energy storage system (e.g., batteries, capacitors, ultracapacitors, fuel cell, etc). The one or more energy storage system may be in electrical communication with the contact plates.

The methods of the invention include transferring power to a vehicle using a charging station. Transferring power to the vehicle can comprise positioning the vehicle under a charging mount of the charging station and engaging a charging connection, such as a pantograph, catenary arm, charging chassis or frame, or charging overhang to establish an electrical connection between the charging station and the vehicle. Transferring power may include any form of electrical connection between a charging connection (which may have any position or orientation) and one or more contact plate (which may be located anywhere on the vehicle). A vehicle may be charged and/or discharged by establishing electrical communication between a power source and an energy storage system of the electric vehicle. For instance, an electrical connection may be made between the power source and charging connection, between the charging connection and contact plate, and between the contact plate and energy storage system.

Examples of configurations for the charging station and/or electric vehicles may include aspects, components, features, or steps provided in U.S. patent application Ser. No. 12/496569 filed Jul. 1, 2009; U.S. patent application Ser. No. 61/289755 filed Dec. 23, 2009; U.S. patent application Ser. No. 61/328,143 (705.101) filed Apr. 26, 2010; U.S. Pat. Nos. 5,461,298; 5,821,731; U.S. Pat. No. RE 29,994; E.P. Patent Application No. 2014505; EP Patent Application No. 1997668; PCT Publication No, WO 2008/107767; PCT Publication No. WO2009/014543, which are hereby incorporated by reference in their entirety.

FIG. 1 shows an example of a vehicle approaching a charging station, in a vehicle charging system provided in accordance with an embodiment of the invention. A vehicle charging system may include a charging station 100 and a vehicle 110 configured to interface with the charging station.

In some embodiments, the charging station 100 may be provided on a portable, semi-portable, or permanent fixed platform. In some instances, the charging station may be movable from one location to another. In some instances, it may be easily deployed at a location, but generally remain fixed at that location. It may also be fixedly integrated into a permanent structure. One example may involve a semi-portable trailer or skid mounted fast charge station. A fast charge station may include a charge pole 120 and vehicle connector head 122, a stationary energy storage module 124, one or more signal receiver 126, and one or more sensor 128.

The charging station may include an electrical connector between the stationary energy storage system 124 and a charging interface, which may be provided on a vehicle connector head 122. The electrical connector may be formed of a conductive material, such as a metal, such as copper, aluminum, silver, gold, or any combination or alloy thereof. In some instances, non-metallic conductive materials may be used. In some embodiments, the electrical connector may be formed of one or more wires, bars, plates, or any other shape or configuration.

The charging station may include a charge pole 120. In some embodiments, the charge pole may be collapsible. The charge pole may include an overhanging arm, which may reach over a vehicle when the vehicle interfaces with the charging station. For example, a catenary arm may hang down from a protrusion over the vehicle, and extend downward and/or at an angle to the vehicle. Alternatively, the charge pole may protrude from a structure, or from a base or ground. The charge pole may enable an electrical connection to be made with the vehicle on the top of the vehicle, on a side of the vehicle, or underneath the vehicle. The charge pole may be collapsible, or be able to be unassembled for easy transport. The charge pole may have an elongated shape, or may have any other shape. The charge pole may be integral with a structure or separate from another structure.

The charge pole 120 may be connected to a vehicle connector head 122. The vehicle connector head may provide an electrical interface for the charging station 100 for electrically connecting with an electrical interface of the vehicle 110. As previously mentioned, the vehicle connector head may electrically interface with the vehicle, anywhere along the surface of the vehicle. The vehicle connector head and any other portion of the charging station may have a configuration that may electrically connect to a vehicle energy storage system to enable the charging and/or discharging of the vehicle energy storage system.

In some examples, a charging interface on the charging station may include a positive electrode and a negative electrode. The positive and negative electrodes may be electrically isolated and insulated from one another. The positive and negative electrodes may each be in electrical communication with the stationary energy storage system. One or more guiding feature may be provided on the charging station, which may enable the vehicle to drive up to the charging station and interface with the charging station. For example, a vehicle may drive beneath an overhanging catenary arm of a charging station with a fast charge electrical interface, and contact the fast charge electrical interface with an electrical interface on top of the vehicle. The structure of the charging station and/or guiding feature may include flexible components or features that may accommodate variations in vehicle size, shape, or direction of travel. The charging station may also include an interface that may ensure a solid electrical connection between electrical interface of the charging station and of the vehicle. For example, one or more pressure component, which may utilize a feature such as a spring or elastic, or an irregular surfice, such as brushes, may be used to ensure contact between the charging station and the vehicle.

The charging station may include a stationary energy storage system 124. Alternatively, the charging station may be directly connected to an external energy source without requiring a stationary energy storage system. The stationary energy storage system may include one or more battery, ultracapacitor, capacitor, fuel cell, or any other way of storing energy. In some examples, the stationary energy storage may include one or more electrochemical batteries. The stationary energy storage may include batteries with any battery chemistry known in the art or later developed. Some batteries may include, but are not limited to, lead-acid ("flooded" and VRLA) batteries, NiCad batteries, nickel metal hydride batteries, lithium ion batteries, Li-ion polymer batteries, lithium titanate batteries, zinc-air batteries or molten salt batteries.

The same storage units or cells may be used, or varying combinations of energy storage units or cells may be used. The energy storage units may be connected in series, or parallel, or any combination thereof. In some embodiments, groupings of energy storage units may be provided in series or in parallel, or any combination.

In some embodiments, a stationary energy storage system may be provided within a housing of the charging station. In some embodiments, the energy storage units may all be provided within a single housing or pack, or may be distributed among multiple housings or packs. As previously mentioned, the stationary energy storage system may be electrically connected to a fast charging interface 122. In some embodiments, one or more groupings of energy storage units (e.g., battery cells) may be directly or indirectly connected to the fast charging interface via one or more electrical connection.

An external energy source may be a utility or grid. In other embodiments, the external energy source may be an energy generator, such as any form of electricity generator. The external energy source may or may not include power sources such as power plants, or renewable energy sources such as solar power, wind power, hydropower, biofuel, or geothermal energy. In some embodiments, the external energy source may include an external energy storage system, which may include batteries, ultracapacitors, fuel cells, or so forth.

The external energy source may electrically connect to a stationary energy storage system 124. Alternatively, the external energy source may be electrically connected to a vehicle connector head 122 without requiring a stationary energy storage system.

The charging station may include a controller. The controller may be able to control the rate of charge for the stationary energy storage system from the external energy source. The controller may also permit or not permit the stationary energy storage system to be charged. In some embodiments, the controller may determine whether the stationary energy storage system is charged, discharged, or if nothing happens. In some instances, the controller may be able to detect or receive information relating to the state of charge of the stationary energy storage system. Any control system may be consolidated or distributed over multiple components. Any action taken by the controller or within a vehicle charging system may be directed by tangible computer readable media, code, instructions, or logic thereof These may be stored in a memory.

A vehicle charging system may also include a vehicle 110. Any vehicle may be able to interface with the charging station. The vehicle may be an electric or hybrid electric vehicle. In some embodiments, the vehicle may be a bus. The vehicle may also be other heavy-duty or high occupancy vehicles, as discussed previously. Any discussion herein relating to a vehicle may relate to any type of vehicle, and any discussion relating to a specific type of vehicle may relate to other types of vehicles.

A vehicle 110 may have a vehicle energy storage system 130. The vehicle energy storage system may be used as a propulsion power source for the vehicle. The vehicle energy storage system may include batteries. In some embodiments of the invention, the vehicle may have one or more additional power sources, such as a combustion engine or a fuel cell. The vehicle may be an electric battery-powered vehicle or a hybrid electric vehicle, and may be able to use the same basic battery configuration, drive motor, and controller, regardless of whether the vehicle is an all-battery vehicle or a hybrid vehicle.

In one embodiment of the invention, the vehicle energy storage system may include lithium titanate batteries. In some implementations, the propulsion power source may in dude batteries that are only lithium titanate batteries, without requiring any other types of batteries. The lithium titanate batteries may include any format or composition known in the art. See, e.g., U.S. Patent Publication No. 2007/0284159, U.S. Patent Publication No. 2005/0132562, U.S. Patent Publication No. 2005/0214466, U.S. Pat. Nos. 6,890,510, 6,974,566, and U.S. Pat. No. 6,881,393, which are hereby incorporated by reference in their entirety.

In accordance with another embodiment of the invention, the vehicle energy storage system may include batteries with any battery chemistry known in the art or later developed. Such electric or hybrid electric vehicle batteries may include, but are not limited to, lead-acid ("flooded" and VRLA) batteries, NiCad batteries, nickel metal hydride batteries, lithium ion batteries, Li-ion polymer batteries, zinc-air batteries or molten salt batteries. In some alternate embodiments, the vehicle energy storage systems may include a combination of lithium titanate batteries and other types of batteries or ultra capacitors.

The use of lithium titanate batteries may enable rapid charging of a vehicle, and a long battery life. In sonic embodiments of the invention a vehicle energy storage system may be able to charge to a very high state of charge within minutes. For instance, in a preferable embodiment, vehicle energy storage system may be able to charge to over 95% state of charge within ten minutes. In other embodiments of the invention, a vehicle energy storage system may be able to charge to over 65% state of charge, over 70% state of charge, over 75% state of charge, over 80% state of charge, over 85% state of charge, over 90% state of charge, or over 95% state of charge within ten minutes, or nine minutes, seven minutes, five minutes, three minutes, or one minute.

In some embodiments, a vehicle, such as a heavy-duty vehicle, may travel a predetermined route, and stop at predetermined points for recharging. See, e.g., U.S. Pat. No. 3,955,657, which is hereby incorporated by reference in its entirety.

The vehicle 110 may have a vehicle charging interface 132 which may be capable of making electrical contact with the charging station 100. The vehicle charging interface may include a conductive material, which may include any of the conductive materials discussed elsewhere herein. In some embodiments, the vehicle charging interface may be provided at the top of the vehicle, while in other embodiments, it may be provided on a side or bottom of the vehicle. The vehicle charging interface may be electrically connected to a vehicle energy storage system 130. They may be connected via an electrical connection of the vehicle. The electrical connector may be formed of a conductive material. In some embodiments, the vehicle charging interface may include a positive and negative electrode. In some embodiments, the electrical connection may include separate electrical connectors for the positive and negative electrodes to the vehicle energy storage system. The positive and negative electrodes may be electrically insulated and/or isolated from one another.

The vehicle 110 may include one or more signal emitter 134. The signal emitter may provide a signal from the vehicle to a signal receiver 126 at the charging station 100. Any type of signal may be provided from the vehicle to the charging station. In some instances, a unidirectional signal may be provided from the vehicle to the charging station. Alternatively, a signal may be provided from the charging station to the vehicle, and/or a two-way communication may be established between the vehicle and charging station. Thus, a signal emitter 134 and a signal receiver 126 may be able to both emit and receive signals. Preferably, the signal may be transmitted wirelessly between the vehicle and charging station.

Examples of wireless signals may include, but are not limited to, radio-frequency (e.g., RFID) signals, bluetooth, control-area-network (CAN) messages, or any other form of communication. A signal between the vehicle and charging station may be received when the vehicle and charging station are within some proximity to one another. For example, the signal may be received when they are about ½ mile, ¼ mile, ⅛ mile, 100 meters, 50 meters, 40 meters, 30 meters, 25 meter, 20 meters, 15 meters, 10 meters, 5 meters, 3 meters, or 1 meter of one another.

The signal may include information about the vehicle's location or position relative to the charging station, the vehicle's orientation, the vehicle's identification, the state of charge of a vehicle energy storage system, or any other information.

An aspect of the invention may provide automatic detection of the vehicle as it nears charging station and recognition of which vehicle is entering which particular charging station. In some embodiments, the detection of the vehicle as it nears and/or the identification of the vehicle may be provided via one or more signal that may be exchanged between the vehicle and the charging station. In some embodiments, such identification may be provided using RFID.

An RFID reader may read a tag located on incoming bus at it enters charger station. The RFID reader may be a signal receiver on a charging station, and the tag may be a signal emitter on a vehicle. The read tag ID may be communicated to the charge station controller by means of digital outputs activated as a binary number (example: bus tag ID 4 is output as 0100). This binary number may be interpreted by the charge station controller and broadcast over CAN. This eliminates the need to have an additional computer system to interpret the output of the RFID reader.

In some embodiments, each vehicle may have a unique tag ID. This may allow the charging station to identify and/or track specific vehicles. For example, each bus in a fleet of buses may have a unique tag ID. The tag ID may or may not be provided in binary. Alternatively, one or more vehicles may have the same tag ID. In some embodiments, the tag ID may denote a group of vehicles, or category of vehicles. For example, all buses having a particular configuration may have a particular tag ID, while another set of vehicles with different characteristics may have another tag ID. The tag ID may be provided with sufficient specificity to determine how a charging station may react to the vehicle. For example, a first vehicle category may have a first set of dimensions that may require the charging station to accommodate the first set of dimensions, while a second vehicle category may have a second set of dimensions that may require the charging station to assume a different configuration to accommodate the second set of dimensions. In some embodiments, a plurality of tag IDs may be provided (e.g., a tag ID for a specific vehicle and a tag ID for a type of vehicle).

A controller area network (CAN) communication between the vehicle and the charge station may be provided via a wireless communication link (e.g., Bluetooth link). If the approaching vehicle is detected to be a non-battery electric vehicle, no action may automatically be taken. For example, if a vehicle is not meant to be charged at the charging station, the vehicle may be permitted to pass through or pass by the charging station without engaging with the charging station. In another example, if the vehicle is configured to be able to interface with the charging station, but it is detected that charging is not desired at that point in time, the vehicle may be permitted to pass through or pass by the charging station without engaging the charging station.

If the approaching vehicle is detected to be a vehicle that may interface with the charging station, and/or to be at a state of charge where it may be desirable to charge the vehicle, the charging station, then charging procedures may be initiated. In some embodiments, each vehicle may recognize its own broadcast ID (e.g., from RFID ID CAN message sent from charge station) upon entering a particular charge station and may automatically begin to transmit proper response CAN messages required for docking and charging at that particular charger station. The incoming vehicle may begin communicating with a specific charger upon seeing its ID broadcast by the charging station.

In some embodiments, a charging station may have one charging connection. Alternatively, a charging station may have a plurality of charging connections. When a plurality of charging stations are provided, a vehicle may be directed to the appropriate charging connection by seeing its ID broadcast the charging station near the correct charging connection.

As a vehicle approaches the charging station, there may be some gentle speed limiting of vehicle in preparation for automatically stopping in the proper location to mate with the charger.

Precise calculation of vehicle position with respect to charger docking position may be provided through the use of time/distance integration using very accurate measurement of drive axle rotation. For example, fractional (e.g., resolution of $\frac{1}{64}$, $\frac{1}{32}$, $\frac{1}{16}$, $\frac{1}{8}$, $\frac{1}{4}$, $\frac{1}{2}$, of a revolution) measurement of motor revolution×known distance per revolution=precise distance traveled. This may be combined with feedback from the charger about when the vehicle passes a certain point (from a sensor 128 on the charge station) thus yielding position with respect to the charger. Any other technique may be provided to provide or calculate a relative position between the vehicle and the charger. Various sensors may be provided in proximity to the charger, which may include but are not limited to, weight sensors, light sensors, motion sensors, temperature sensors, magnetic field sensors, gravity sensors, vibration sensors, pressure sensors, electrical field sensors, sound sensors, or sensors that may detect other physical aspects.

In some implementations, vehicle position verification using topographic "mapping" of the top of the vehicle may be provided. Similarly, vehicle position verification or mapping of the vehicle may be provided from the bottom of the vehicle, side of the vehicle, or along any orientation of the vehicle. Vertical distance to specific, known features on the roof of the vehicle may be measured using a linear distance sensor mounted above, below, or on the side of the vehicle. Measurements may be matched to known dimensions on the roof to ensure accurate location of vehicle, both fore-aft and left-right. This feature may ensure the docking arm is brought down in the correct location to mate with the vehicle. In addition, this feature may allow the rejection of other, non battery electric vehicles.

Automatic stoppage of vehicle in proper location to dock with charger may be provided. In some embodiments, the automatic stopping may occur via application of on-board regenerative braking. For example, a signal may be provided from the charging station to the vehicle in order to instruct the vehicle to engage the brakes. The signal may be provided to a vehicle controller which may provide signals to driving mechanisms of the vehicle (e.g., brakes, motor, steering). In some instances, there may be automatically controlled forward movement of vehicle to fully seat the charger. Similarly, signals may be provided between the charging station and the vehicle to inform the vehicle to move forward in a particular manner. The signal may cause a motor speed to be controlled, and thereby a vehicle speed to be controlled. For example, the signal may inform a motor to slow down, thereby causing the vehicle to slow down.

In some embodiments, such controls may be similar to automatic docking of the vehicle with the charger. The driving controls of the vehicle may be engaged based on signals between the vehicle and charging station, and the direction and/or speed of the vehicle may be controlled to bring the vehicle to a desired position and/or orientation. Such control signal ma originate from a charging station controller and/or vehicle controller. In some embodiments, a driver may or may not be able to manually override the vehicle control. In some embodiments, normal operation of brake and accelerator pedals is retained so that driver can stop or drive away at any time if required in the event of an emergency. In some embodiments, components or features of the charging station may move to assist with the engagement between the vehicle and the charger. For example, a driver may bring a vehicle roughly to a desired location, and one or more features of the charging station may be adjusted to accommodate the vehicle.

CAN message arbitration may allow multiple vehicles to use the same charge station at the same time. For example, if multiple signals are provided between multiple vehicles and the same charge station, the CAN may be able to track which signals are applicable to which vehicles. In some embodiments, the tag ID of each vehicle may be provided with each of the emitted signals, so relayed instructions may be tracked to the proper vehicle.

Drivers LCD screen displays information about docking procedure and is used to give any required instructions or communicate faults.

In some embodiments, one or more charge station control system inputs may be provided. Such inputs may be provided from the vehicle, or from the charging station. Some examples of inputs that may be provided may include, but are not limited to, charge arm up position, charge arm down position, current passing brushes position, neutral brush position, charge head landed on vehicle position, charge head over-temperature, individual (10) brush currents, air supply pressure, RFID Tag ID from RFID reader, ultrasonic linear distance measurement. CAN messages from bus (e.g., bus readiness for charge status, charge arm commands, battery charging requirements), or CAN message from chargers (e.g., charger readiness status, instant charge voltage, current and power, cumulative energy delivered).

Accordingly, one or more charge station control system outputs may be provided. Such outputs may include, but are not limited to, charge arm down solenoid, charge arm up solenoid, extend current passing brushes solenoid, extend neutral brush solenoid, or CAN messages (e.g., RFID Bus ID, position of arm status, position of brushes status, ultrasonic measurement, charge station readiness status).

In some embodiments, the following automatic charge station docking control system features may be provided. For example, a docking procedure may be tolerant of driver stopping too early (prior to auto stop) or being out of position (left-right) and may instruct driver to reposition or try again. In some embodiments, a driver can stop or exit from docking procedure at any time simply by releasing parking brake or driving away.

A CAN system status message can terminate process in the event of a failure after a period of time by sending error message to chargers and bus. The period of time may have any value include, but not limited to, 1 ms, 5 ms, 10 ms, 50 ms, 100 ms, 150 ms, 200 ms, 250 ms, 300 ms, 350 ms, 400 ms, 450 ms, 500 ms, 600 ms, 750 ms, 1 second, 1.5 seconds, 2 seconds, 3 seconds, 5 seconds, 10 seconds, 30 seconds, or 1 minute.

The vehicle charging system may include any of the components, features, characteristics, or incorporate any of the steps involved with a vehicle, such as one described in U.S. Patent Publication No 2010/0025132, which is hereby incorporated by reference in its Entirety.

Figure 2:
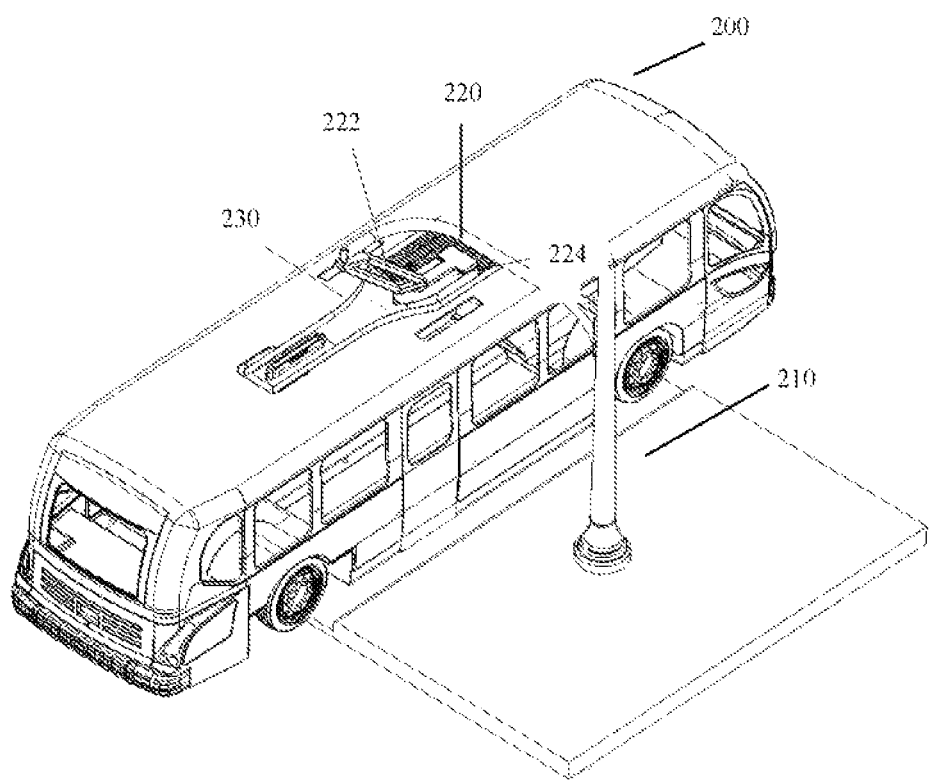
FIG. 2 shows an example of a vehicle engaged with a charging station.

FIG. 2 shows an example of a vehicle 200 engaged with a charging station 210. For example, the vehicle may be beneath an overhanging arm 220 of the charging station. A charging head 224 may be connected to the overhanging arm via an arm connection assembly 222. In some embodiments, the arm connection assembly may be hanging downward and/or at an angle. The charging head may contact a vehicle charging interface 230 on the vehicle. In some embodiments, the vehicle charging interface may include one or more guides that may assist with guiding the charging head to a desired location of the vehicle charging interface.

The vehicle charging interface 230 may electrically contact a charging head 224. This may enable an energy source from the charging station to be electrically connected to the vehicle energy storage system. They may be electrically connected via a fast charging interface. The fast charging interface may enable control over the rate of charge and/or discharge of the vehicle energy storage system by the stationary energy storage system. In some embodiments, a controller may be provided on the charging station or on the vehicle that may control the rate of charge and/or discharge of the vehicle energy storage system. The controller may also permit or not permit charging of the vehicle energy storage system. In some embodiments, the controller may determine whether the vehicle energy storage system is charged, discharged, or if nothing happens.

As previously described, a vehicle may approach a charging station and come into contact with the charging station to establish a charge electrical interface. When the vehicle comes into contact with the charging station, an energy storage s stem on the vehicle may be charged by a stationary energy storage system of the charging station, an external energy source, or any energy source upstream of the fast charge electrical interface. A stationary energy storage system may be electrically connected to an external energy source via a slow charger.

In some embodiments, multiple stationary energy storage systems may be provided. These stationary energy storage systems may be provided in series, in parallel, or in any combination thereof. Each of the stationary energy storage systems may be charged and/or discharged at the same rate or at different rates. In some embodiments, each stationary energy storage system may be discharged at a faster rate than it is charged.

In accordance with an implementation of the invention, a vehicle may make a mechanical connection (pilot) to the charger head to enable charging. If this mechanical connection is lost, charging can stop after a period of time. In some embodiments, the period of time may have a predetermined value. For example, the period of time may be 1 ms, 3 ms, 5 ms, 10 ms, 15 ms, 20 ms, 25 ms, 30ms, 35 ms, 40 ms, 50 ms, 60 ms, 75 ms, 100 ms, 150 ms, 200 ms, 300 ms, 500 ms, 750 ms, 1 second, 2 seconds, or 5 seconds. Loss of air pressure (used to actuate charge head arm and current passing brushes) or detection of any vehicle movement while still docked may interrupt this pilot signal to stop charging in the shortest time possible. Any other fault or error detection may cause the charging to stop.

While a vehicle is charging, one or more brushes that may be provided in a charging head 224 may contact a vehicle charging interface 230. Any other electrical connection may be established. When an error or fault is detected, the charging may be stopped to eliminate or reduce the chance of current brushes retracting off the vehicle blade while current is still flowing.

In some embodiments, a vehicle may dock with a charging station after a set of predetermined criteria have been met. Some examples of conditions that may be required to allow docking may include: (1) charge head arm up (detected home position sensor), (2) air pressure ok (pressure transducer), (3) charging brushes retracted (position sensor), and (4) charger status ok (CAN message from charger).

Some implementations may include automatic battery charging process control system features. For example, communication, via wireless CAN to a charger, of a vehicle battery state-of-charge may be provided. In some embodiments a requested charging voltage and/or current may be provided. Brush current sensors may monitor individual brush currents and charging current can be altered (up or down) to maintain highest possible charge rate without forcing too much current through the brushes. The current may be monitored to provide any desired current for a condition. One or more sensor may also determine a brush position (e.g., whether a brush is extended or retracted).

In some embodiments, a total required charge (kWh) may be tailored based on historical knowledge of energy consumption of vehicle. Historical usage, predicted future requirements, and knowledge of electrical charges and rate schedules may be considered and used to adjust both charge rate and vehicle charging frequency in order to minimize or reduce electrical demand charges and make the most efficient use of on-board energy storage. For example, if the next predicted charge of the vehicle is predicted to occur in a short interval and the battery state of charge is sufficiently high, it may be desirable to provide only minimal charging to the vehicle. In another example, if the next charge is predicted to occur after a long interval, it may be desirable to charge the vehicle more.

In some embodiments, before or during charging, a sensor may provide one or more signal to a charging controller. In some instances, the sensor may provide information about one or more error or alert state. For particular error or alert states, the system may react. For example, the system may react by stopping the process and/or altering a parameter of the process. For example, a temperature sensor may determine the temperature within a charging head. Over-temperature in the charging head may immediately stop charging process.

Figure 3:
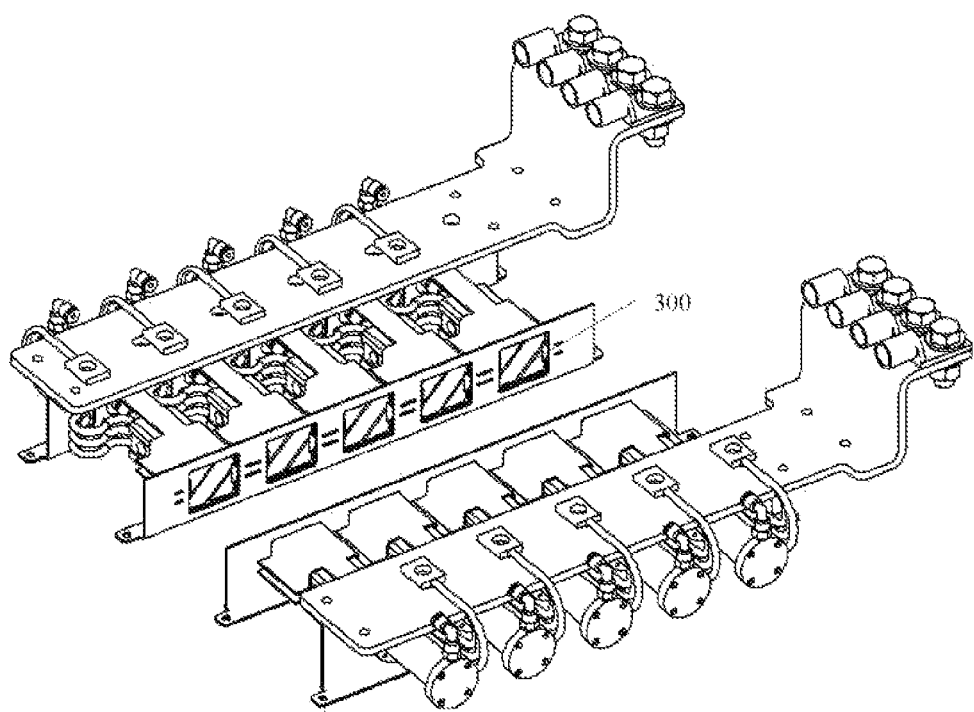
FIG. 3 shows an example of a charging connection of a charging station.

FIG. 3 shows an example of a charging connection of a charging station. Any other types of charging connection may be used. A charging connection may include one or more brush 300. A brush may provide electrical contact between the charging connection and a vehicle charging interface. A brush may be formed of an electrically conductive material, such as a metal, or any other conductive material discussed elsewhere herein. A brush may have any form or shape, which may include bristles, a bar, a plate, one or more protrusions, one or more grooves, or even and/or uneven surfaces.

A brush may have a first position and a second position. In some embodiments, the first position may be a retracted state and the second position may be an extended state. In some embodiments, a brush in the first position may not make electrical contact with the vehicle, and the brush in the second position may make electrical contact with the vehicle. For example, a brush in a retracted state may not be in electrical communication with a vehicle energy storage system. Similarly, a brush in an extended state may be in electrical communication with the vehicle energy storage system.

When a vehicle arrives at a charging station and is determined to correctly positioned, the brushes may be extended to contact a charging interface of the vehicle. When charging is complete and/or an error is detected, the brushes may be retracted and no longer contact the charging interface of the vehicle. As discussed previously, other charging configurations or interfaces may be used. Other charging configurations or interfaces may provide a first and second position for a part of a charging interface that may establish and break an electrical connection, respectively.

A brush may be extended automatically when the vehicle is determined to be in a desired position. A brush may also be extended in response to a signal or request to extend the brushes. Such a request may be made by a driver of the vehicle, or an operator of a charging station. Similarly, a brush may retract automatically when charging is complete or an error state is detected. A brush may also be retracted in response to a signal or request, which may be made by a driver or operator.

Method

FIG. 4 provides a high level depiction of an automated charging method in accordance with an embodiment of the invention. An automated charging method may include vehicle arrival detection, vehicle positioning, and vehicle charging.

Vehicle arrival detection may identify that a vehicle is approaching a charging station. In some embodiments, the arrival detection may also identify the specific vehicle approaching or the type of vehicle approaching. Vehicle arrival detection may also be able to determine the location or the vehicle and/or the position of the vehicle with respect to the charging station. Other parameters associated with the vehicle, such as the speed and/or direction of the vehicle may be determined. Such vehicle arrival detection may be automatic as the vehicle enters a predetermined proximity of the charging station. The detection may be provided when a signal emitted from the vehicle is received by the charging station.

Vehicle positioning may include automated positioning of the vehicle. In some embodiments, as a vehicle approaching the charging station, the charging station may use information gathered during vehicle arrival detection to control the vehicle drive controls to bring the vehicle into a desired position. For example, the charging station may control the steering, acceleration and/or deceleration of the vehicle. In another example, one or more configuration of the charging station may be altered to accept the vehicle. A charging connection may be made between the vehicle and the charging station.

Vehicle charging may include the actual charging of the vehicle. The rate of charge and/or discharge of a vehicle energy storage system may depend on information gathered during vehicle arrival detection and/or vehicle positioning. For example, the batter y state of charge or any historical/predictive information about the vehicle may be used to determine whether to charge the vehicle or how much to charge the vehicle. When the desired amount of charging is complete, the vehicle may be disconnected.

FIG. 5 provides a depiction of an automated charging method in accordance with an embodiment of the invention. The automated charging method may include the steps of identifying a vehicle arrival, locating the vehicle, connecting the charging arm with the vehicle, automatically positioning the vehicle, charging the vehicle, and procedures when charging is complete. In some instances, vehicle arrival detection may include identifying the vehicle arrival and locating the vehicle. Vehicle positioning may include connecting a charging arm with a vehicle and automated vehicle positioning. Vehicle charging may include charging the vehicle and undergoing procedures when charge is complete.

During vehicle arrival identification, the vehicle may approach the charging station. Signals may be exchanged between the charging station and the vehicle, thus allowing communications between the two. A driver may drive the vehicle to an approximate desired location. In some embodiments, one or more guides may be provided that ma assist with directing the driver to the desired location. The vehicle may be identified. In some embodiments, the specific vehicle may be identified. Alternatively, the vehicle type may be identified. The vehicle position may be automatically controlled. For example, the speed of the vehicle may be reduced. In some instances, the direction of the bus may also be controlled. The station may determine whether the vehicle is meant to interface with the charging station. If the vehicle is not meant to interface with the charging station (e.g., if the vehicle is not an electric vehicle, or if the vehicle state of charge is sufficient), nothing may occur and the vehicle may pass through or pass by the charging station. If the vehicle is meant to interface with the charging station, the vehicle location may be determined.

Locating the vehicle may involve receiving one or more signal to determine the position of the vehicle relative to the charging station. For example, one or more ultrasonic sensor may be used to detect when the vehicle passes a particular position. The sensor may be able to detect a locating feature of the vehicle. In some embodiments, a controller may determine whether a locating feature was sensed within an appropriate amount of time. If not, the bus may be determined to be out of position and a driver may try to reposition the bus. If the feature is detected within a desired amount of time, the bus may be determined to be in a desired position, and the bus may be automatically stopped.

Connecting the charge arm to the vehicle may occur as the bus is within a desired location relative to the charge station. For example, if a charge arm is overhanging the vehicle, the charge arm may be lowered onto a roof guide of the vehicle. The roof guide may have some tolerance that may enable the charge arm to contact the roof guide even if the bus is not at a very precise position. A controller may determine whether the charge arm is down. If the charge arm is not down, an error may have occurred, and the process may be stopped. If the charge arm is down, the procedure may continue.

Automated vehicle positioning may occur after a charger is connected to the vehicle. The vehicle may automatically be put into a desired location. For example, a vehicle may be automated moved a particular amount within a desired speed limit. The vehicle may be automatically stopped when it is at a desired location. In some instances, the vehicle brakes may automatically be engaged. A controller of the system may determine whether the bus is at the desired location and that the brake is set. If not, then the controller may determine that an error has occurred. If no error is detected, and the vehicle is a passenger vehicle, such as a bus, the movement of the vehicle may be locked and passengers may be allowed off.

Vehicle charging may occur after a vehicle is at a desired position and a connection is established between the charging arm and the vehicle. The charging arm may include one or more brushes, and may extend such brushes to form electrical contact with the bus. A controller may determine whether the brushes have been extended. If the brushes are not extended, an error may be detected. If only some of the brushes are extended, the procedure may or may not continue. Once the brushes are extended, current flow may begin. One or more sensors may be provided which may check whether the current and temperature are within a desired range. If not, an error may be detected and the charging connection may be broken. If they are within the desired range, charging may continue until complete.

Once charging is complete, one or more steps may be provided. For example, the system may log charge metrics and release brushes. A controller may determine whether brushes have been successfully released. If they have not, then an error may be detected and the connection between the vehicle and charging station may be broken. If no error is detected, the charge arm may be released and disconnected from the vehicle. For example, a charge arm may be lifted. The controller may detect whether the arm has been successfully lifted. If it has, charging may be complete, and the vehicle may be unlocked (e.g., a brake may be released). The driver may drive the vehicle away when ready.

FIG. 6A-F provides a block diagram for a docking and charging procedure as provided in an embodiment of the invention. FIG. 7A-G provides a table describing the steps for an automatic docking and charging procedure. The features described in the block diagram and table may be used in combination or separately. The diagrams and table provide examples of steps for a docking and charging procedure in accordance with an embodiment of the invention, and any steps described therein may be optional, in a different order, may be exchanged with similar steps, or may have additional steps added thereto.

Figure 6A:
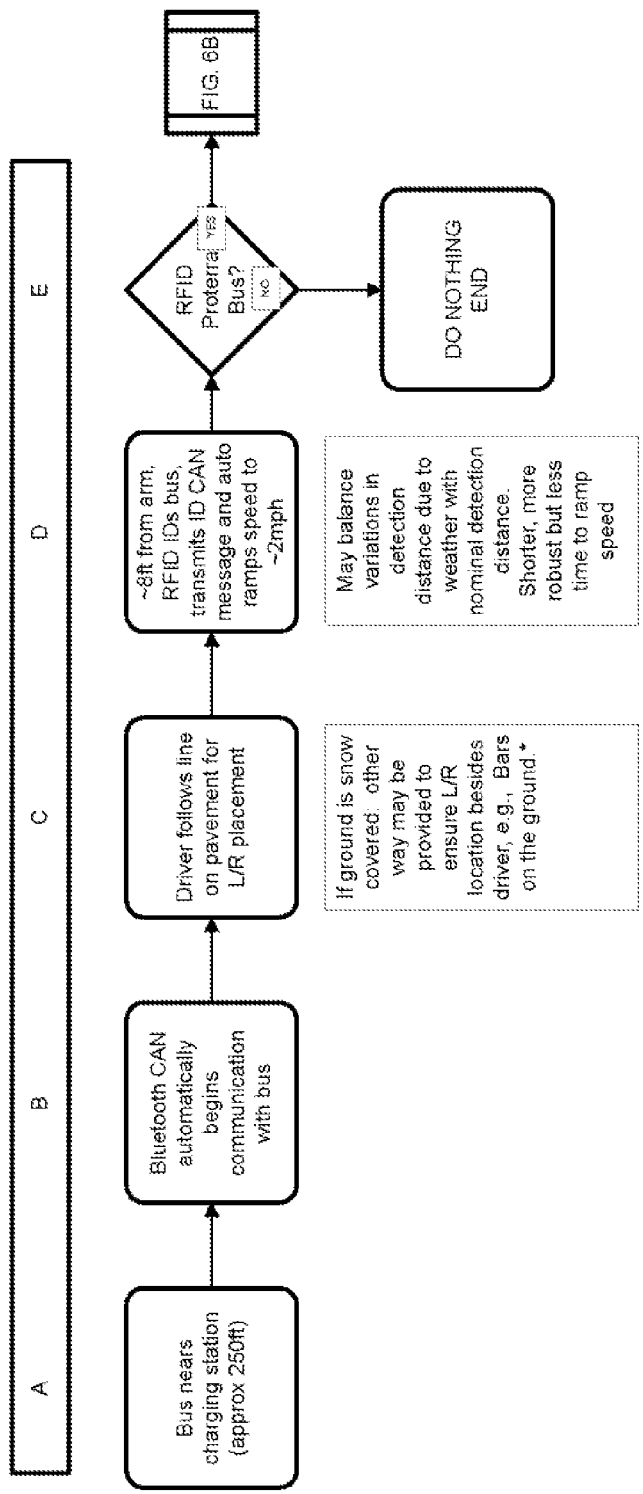
FIG. 6A-F provides a block diagram for a docking and charging procedure as provided in an embodiment of the invention.

FIGS. 6A and 7A provide an example of steps involved in identifying a vehicle arrival. In one example, the vehicle may be a bus, although any description herein may also apply to any other type of vehicle. A bus may near a charging station, as provided in step A. In some embodiments, a bus may be near a charging station at a predetermined distance from the charging station. The predetermined distance may be fixed or may vary based on circumstance. In some instances, the predetermined distance may be about 3000 feet or less, 2000 feet or less, 1500 feet or less, 1000 feet or less, 750 feet or less, 500 feet or less, 300 feet or less, 250 feet or less, 200 feet or less, 150 feet or less, 100 feet or less, 50 feet or less, or 10 feet or less. A vehicle controller on the bus may look for one or more signals (e.g., CAN messages from Bluetooth). The charging station may be waiting for a signal from the bus. For example, the charging station may be waiting for CAN messages from the bus. The charging station may perform periodic air pressure tests.

As indicated in step B, signals may be exchanged between the bus and the charging station. For example, Bluetooth CAN may automatically begin communication with the bus. In some embodiments, one bus can be provided per CAN network. Alternatively, multiple buses may communicate over a CAN network, or other network. This may be desirable in situations where a charging station can accommodate multiple vehicles.

When bus receives a signal, it may start a main routine (e.g., upon receipt of a charging station CAN message). This may set a charger readiness flag on the bus, upon receiving a good communication from the charging station. In some embodiments, a display may be provided, either at the charging station, or within the bus. The display may indicate which charge station to go to, or a status of the station (e.g., charging readiness). The display may also indicate to the driver the speed of the bus (e.g., mph). In some embodiments, a vehicle control system may apply a filter to the charge station CAN messages based on the side of the charger. This may be done using RFID. The display may indicate whether a connection has been made. Preferably, such an indication may be provided as soon as possible. A driver may be trained to stop by themselves if no connection signal is made.

Meanwhile, the charging station may be checking for air pressure, and may check on the status of the charger. For example, the charging station may check for an ok from the charger. It may then send an ok to a charge flag. The charging station may also check on the status from RFID. The charging station may also determine that the charging arm position is up, and check so that any subsequent ultrasonic sensor readings may be accurate.

Step C indicates that a driver may drive the bus to an approximate desired position. One or more guides may be provided to assist the driver with positioning. For example, a line may be provided on the pavement for left/right placement. Additional types of guides may be used. For example, bars, flags, hanging lines, or other guides may be provided.

In some instances, no control information may be provided for initial left/right placement of the bus. Alternatively, a display may indicate whether the driver should move more toward the left or right. The display may also indicate to the driver to slow down if the driver is going too fast. If the driver moves too fast, the bus may not be charged.

A bus may be identified as indicated in step D. In some instances, RFID may be used to identify the bus, although any other signal may be used. The bus may be identified at a distance from the charging arm. In some embodiments, the distance may be about 100 feet or less, 50 feet or less 30 feet or less, 10 feet or less, 8 feet or less, 5 feet or less, 3 feet or less, 1 foot or less from the charging arm. An RFID tag on the bus may result in the transmission of a bus ID CAN message. Upon receipt of that ID CAN message the bus may automatically ramp its speed to a desired speed. One example of a desired speed may be about 15 mph or less, 10 mph or less, 8 mph or less, 5 mph or less, 3 mph or less, 2 mph or less, or 1 mph or less. In some embodiments, accommodations may be made to balance variations in distance of detection. Such variations may occur due to weather or other conditions. In some instances, the speed ramping may be affected based on variations in detection distance.

As indicated in step E, a controller may determine whether the bus is a bus that is intended to interface with the charging station. This may depend on the specific bus ID, or the type of the vehicle. This may or may not take into account the state of charge of the bus and/or any historic/predictive information. If the bus is not meant to interface with the charging station, no steps may be taken. Alternatively, steps not leading to charging the vehicle may be taken.

The bus controls may monitor driver speed and disallow docking if the speed is too high. The bus speed may be provided on a display, whether or not auto control has taken place. A CAN message may be provided indicating whether RFID has detected the bus. A bus controller may ensure that the bus is in first gear, or operating at a desired speed. Upon receipt of the RFID CAN message, vehicle speed limiting may occur. For example, a vehicle speed may be ramped to 3 mph or less, or 2 mph or less, or any other speed discussed elsewhere. The bus controls may wait for a signal from an ultrasonic sensor. In some instances, charging may be disallowed if ride-height is not nominal. In some instances, a tolerance range may be provided for a bus ride height. For example, a height delta of 2 feet or less, 1 feet or less, 6 inches or less, 4 inches or less, 3 inches or less, 2 inches of less, 1 inch or less may be provided. The display may indicate when a bus is at a desired position, and the bus may be stopped.

The charging station control may communicate with the bus. In one example, RFID may come through the Ethernet, to a CAN gateway, or potentially from reader outputs. The charging system controls may communicate with bus controls. In some instances, control decisions may be made by the charging station controls, vehicle bus controls, or both.

Figure 6B:
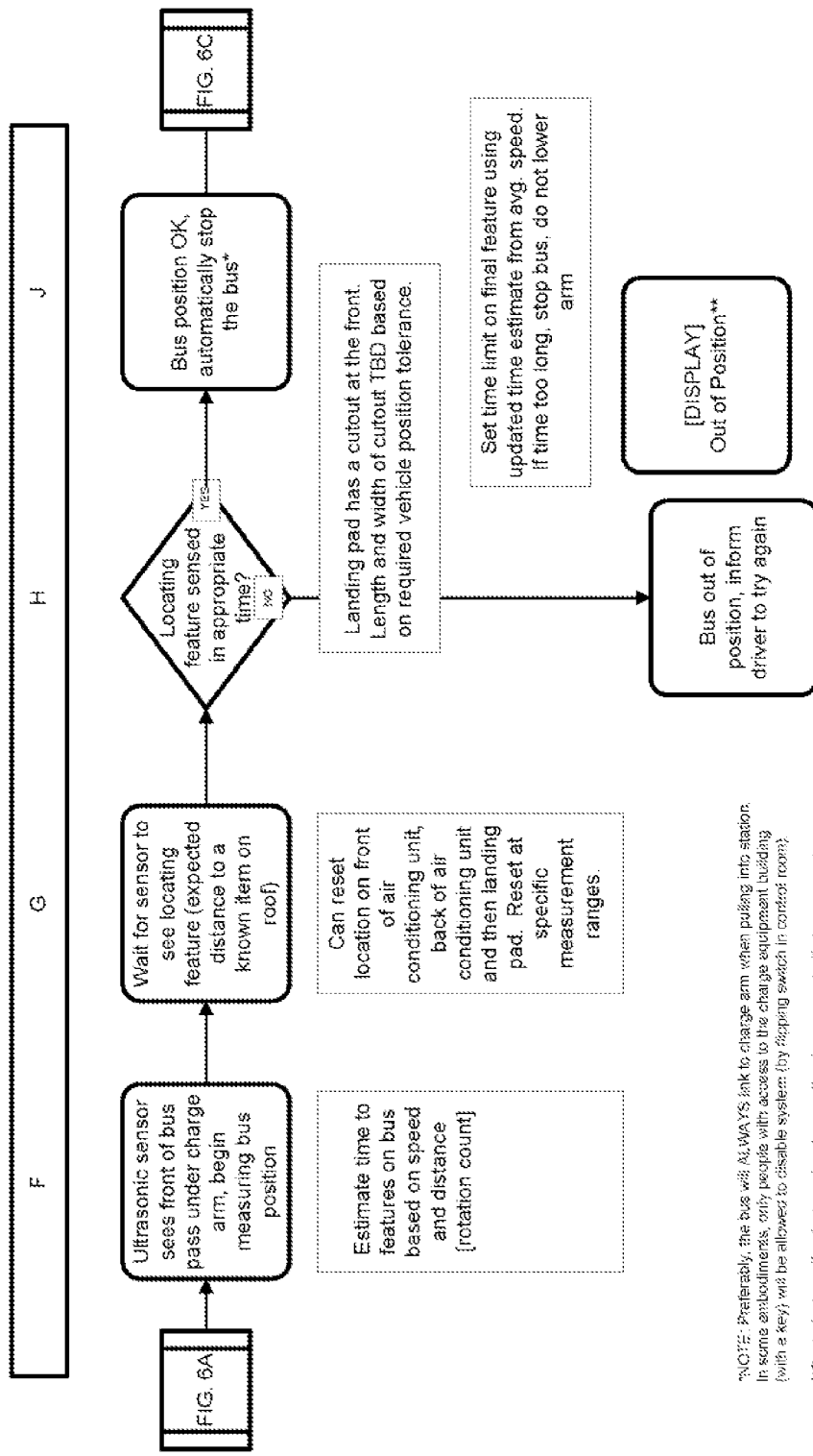

FIGS. 6B and 7B provide an example of steps involved in locating a vehicle. As provided in step F, a sensor may determine if a bus is at a desired position. For example, an ultrasonic sensor may see the front of a bus pass under a charge arm. Then the sensors may be used to begin measuring bus position. In some embodiments, a bus's subsequent position may be detected using sensors or may be calculated based on data collected about the bus at specified points in time. For example, if a bus' location, speed, and/or direction is known at a particular time, the bus' subsequent positions may be calculated or estimated. Bus wheel rotation count may assist with determining bus location.

In step G, the system may wait for a sensor to see a locating feature (e.g., expected distance to a known item on a roof). For example, a bus may have a locating feature on a roof or any other part of the bus that may be detected by a sensor. In some instances, one or more locating feature may be provided at the front of the bus, at the front of a roof guide, at a contact plate, at the rear of a roof guide and/or at a rear of the bus. Locating features may or may not be provided at specific measurement ranges. The sensors used to detect a locating feature may be ultrasonic, optical, mechanical, electrical, magnetic, thermal, or may include any other types of sensors described elsewhere herein.

A vehicle controller and/or charging station controller may receive a CAN message containing distance measurement information from an ultrasonic sensor that indicates that the bus has passed under a charging arm. Distance integration may begin. One or more reset points may be provided, which may correspond to one or more locating feature. In one example, distance integration to a reset point 1 (beginning of Air Condition unit) may occur. A watchdog time to reset point 1 may be based on average speed. Reset points may be specific measurements of an ultrasonic sensor. The time to reset point 1 may be stored in a register and checked against bounds. The system may continue integration from the front of the bus if time to reset point 1 is out of bounds. If the time is in bounds, integration to point 1 may be reset. The system may then begin distance integration to reset point 2 (back of Air Condition unit). The system may watchdog time to reset point 2 based on average speed. The time to reset point 2 may be stored in a register and checked against bounds. The time since initial start of integration may be checked as a potential back-up. The system may then wait for a final location point 3 (e.g., portion of charge arm landing ramp that is lower by several inches), and time to this point may be carefully bounded. The left and right location of the bus relative to the charge arm may be verified by a final location point 3 distance measurement that may only be correct if the bus is positioned appropriately both front/rear and left/right. Any number of reset points (e.g., 1 or more, 2 or more, 3 or more, 4 or more, 5 or more, 6 or more, 8 or more, 10 or more, etc.) may be provided at any location of the bus. The various reset positions and timing may be provided in accordance with an embodiment of the invention.

The charging station may check for a proper signal from ultrasonic sensors. The signal may preferably be within a window allowing for ride height differences.

At step H, a controller may determine whether a locating feature was sensed in appropriate time. In one example, the appropriate time may be about 1 minute or less, 30 seconds, or less, 20 seconds or less, 15 seconds or less, 10 seconds or less, 8 seconds or less, 5 seconds, or less, 3 seconds or less, 1 second or less, 500 ms or less, 250 ins or less, 100 ins or less, or 50 ms or less, or any other time frame discussed elsewhere herein. If the locating feature is not sensed, the bus may be out of position, and the driver ma be informed to try again. If the locating feature is sensed in the required amount of time, the bus position may be ok.

If a final point measurement and time are both within the desired range, a bus controller may begin a bus stop routine. The doors may be disabled unless a parking brake is set, in case the bus driver stop the bus too soon. If a bus driver does stop a bus too soon, a display may indicate as such. The display may also inform the driver that to charge the bus, the driver may need to release the brake and pull ahead slowly when safe. The bus may automatically stop when it is in the correct position.

Step J indicates that when a bus position is within a desired range, the bus may be automatically stopped. A bus controller may ramp the bus speed to zero using regenerative braking. This may be done in as short a time as comfortably possible. The controller may wait for the bus to reach zero speed. Then the bus may be shifted to neutral and a brake may be engaged. For example, the controller may apply rear door brake interlock. A display may indicate that the bus is waiting for the charge arm to lower. The bus may move ahead automatically.

Figure 6C:
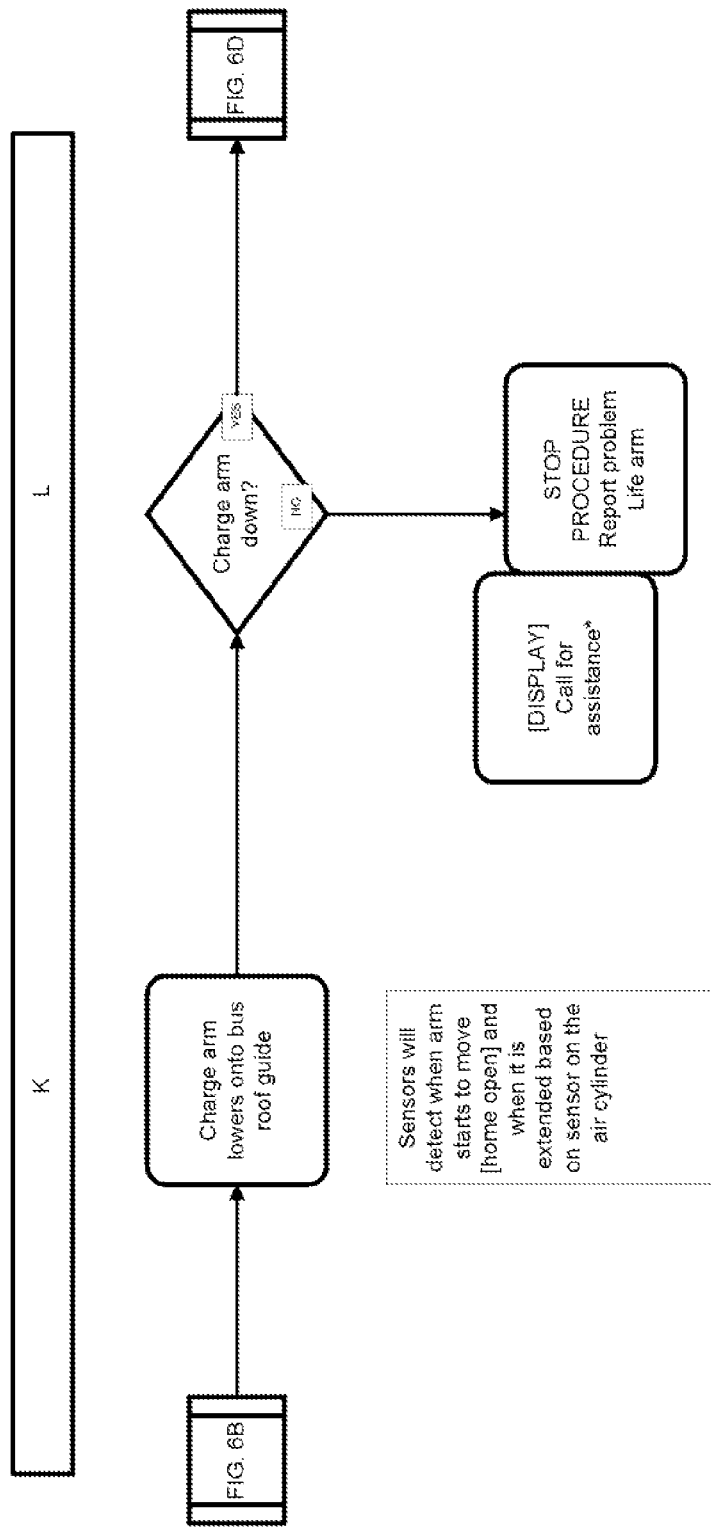

FIGS. 6C and 7C provide an example of steps involved in connecting a charging arm with a vehicle. As provided in step K, a charge arm may be lowered onto a bus roof guide. The bus roof guide may have some tolerance build in so that the charge arm may engage with the roof guide even if the bus is not at a precise location. Sensors may detect when the charge arm starts to move, and when it is extended. In some embodiments, the sensors may be able to detect this based on a sensor in an air cylinder of the charge arm. Any other sensors may be used to determine the position of a charge arm.

A bus or charging station controller may be used to begin an arm-lowering sub-routine. The bus controller may send a signal to the charging station that the bus is in position. This may cause the arm to be lowered. The arm movement may be checked. For example, the arm movement may be checked by loss of home position. The system may also check whether the arm cylinder is down and then wait for head down indication (ex. Microswitches). A charging station controller may actuate an arm down solenoid. Any other type of actuator may be used to cause the arm to move. For example, motors, solenoids, linear actuators, pneumatic actuators, hydraulic actuators, electric actuators, piezoelectric actuators, or magnets may be used. The charging station may send the arm moving. The arm may move down.

Step L may check whether the charge arm is down. For example, two switches may close when charge arm is on a landing pad. If it lands short or to the side, both switches may not make contact. If the arm is detected to not be down, an error CAN message may be provided. This may stop the procedure and a problem may be reported. If the arm is partially down, the arm may be lifted. A display may indicate to the driver call for assistance. Once all switches are good, a bus controller may begin a final bus movement subroutine.

Figure 6D:
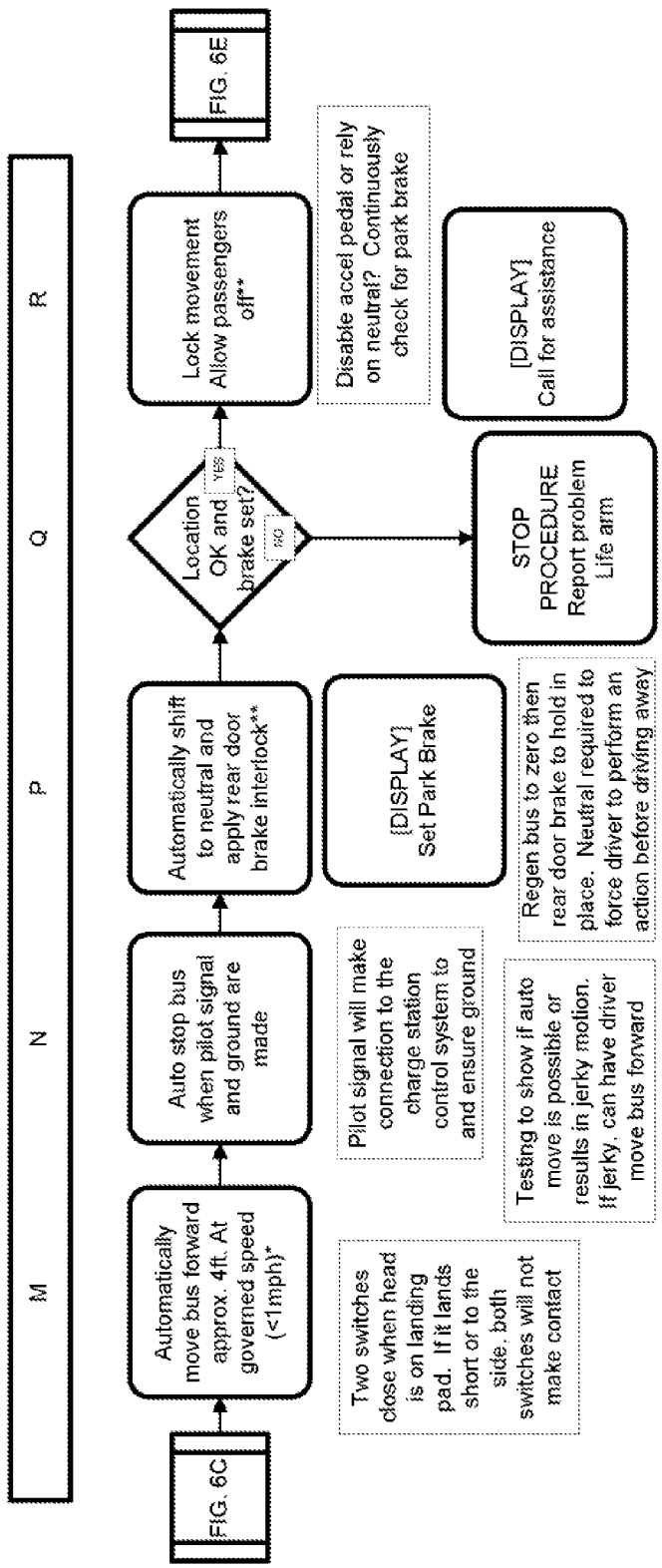

FIGS. 6D and 7D provide an example of steps involved in automated vehicle positioning. In step M, a bus drive mechanism may be automatically controlled to place bus in a desired position. For example, the bus may be automatically moved forward at a governed speed. In some instances, the bus may be moved forward about 20 feet, 15 feet, 12 feet, 10 feet, 7 feet, 4 feet, 3 feet, 1 foot, or any other distance described elsewhere herein. In some embodiments, the governed speed may be about 10 mph or less, 8 mph or less, 5 mph or less, 3 mph or less, 2 mph or less, 1 mph or less, or any other speed described elsewhere herein. The bus may move forward automatically, or the driver may be instructed to move the bus ahead and then it may automatically stop once a charge head is engaged with the bus. In some embodiments, one or more switches may be provided to make contact when a bus is at a desired location.

A bus controller may indicate on a display that the bus will move forward automatically and then stop to charge. The bus may also inform the driver to release a brake pedal. Alternatively, the brake pedal may automatically be released. In some embodiments, a bus controller may check that the driver is off the pedal. The bus controller may send a motor torque signal as low as possible to move the bus slowly and smoothly. This may begin distance integration as soon as the bus moves to use a watchdog. The bus controller may wait for a pilot signal to indicate the charge head is in the correct position.

Step N provides that a bus may be automatically stopped when a pilot signal and ground are made. This may indicate that the bus is at a desired position. In some instances, a bus controller may automatically stop the bus once it is in position using the same procedure as described in step J. Alternatively, a different procedure may be used.

Step P may allow the bus to be automatically shifted to neutral and a brake may be automatically engaged. The brake may be a rear door brake interlock. Automatic stops may be accomplished by regenerative braking or by controlling a motor to zero rpm. Once a bus is in final position, a rear door brake interlock may be automatically applied (to prevent the bus from rolling), and the bus may be shifted to neutral. In some instances, a display may inform a driver to set a parking brake. The driver may be instructed to set a parking brake, or the parking brake may be automatically engaged. Once the desired brakes are engaged, the doors may be opened and charging may start. If the driver wants to drive away prior to setting the parking brake, he may step on the brake and shift to drive. This may release the rear door brake interlock. The doors may be prevented from opening to discourage this under normal circumstances. If the parking, brake had been set and charging started, releasing the parking brake may be sufficient to stop charging. Releasing the parking brake during charging may be considered an abnormal condition.

A bus controller may apply regenerative braking to reduce the bus speed to zero. The bus controller may also automatically shift the transmission to neutral. Alternatively, a driver may be instructed to shift the transmission to neutral. The bus controller may apply a rear brake interlock. A display may indicate to the driver to set a parking brake to allow bus doors to open and the bus to charge.

Step Q may allow a controller to check if the bus location is within a desired range, and whether the desired brakes are set. If this condition is not met, the procedure may be stopped. A problem may be reported and/or the arm may be lifted. The bus controller may check for a parking break.

In accordance with step R, bus movement may be locked to allow passengers off. In some embodiments, an acceleration pedal may be disabled. The system may continuously check for a parking brake. Once the bus movement is locked, the doors may be allowed to open, and a display may indicate that the bus is charging. A charging station controller may check for a pilot signal from a charger prior to allowing charging.

Figure 6E:
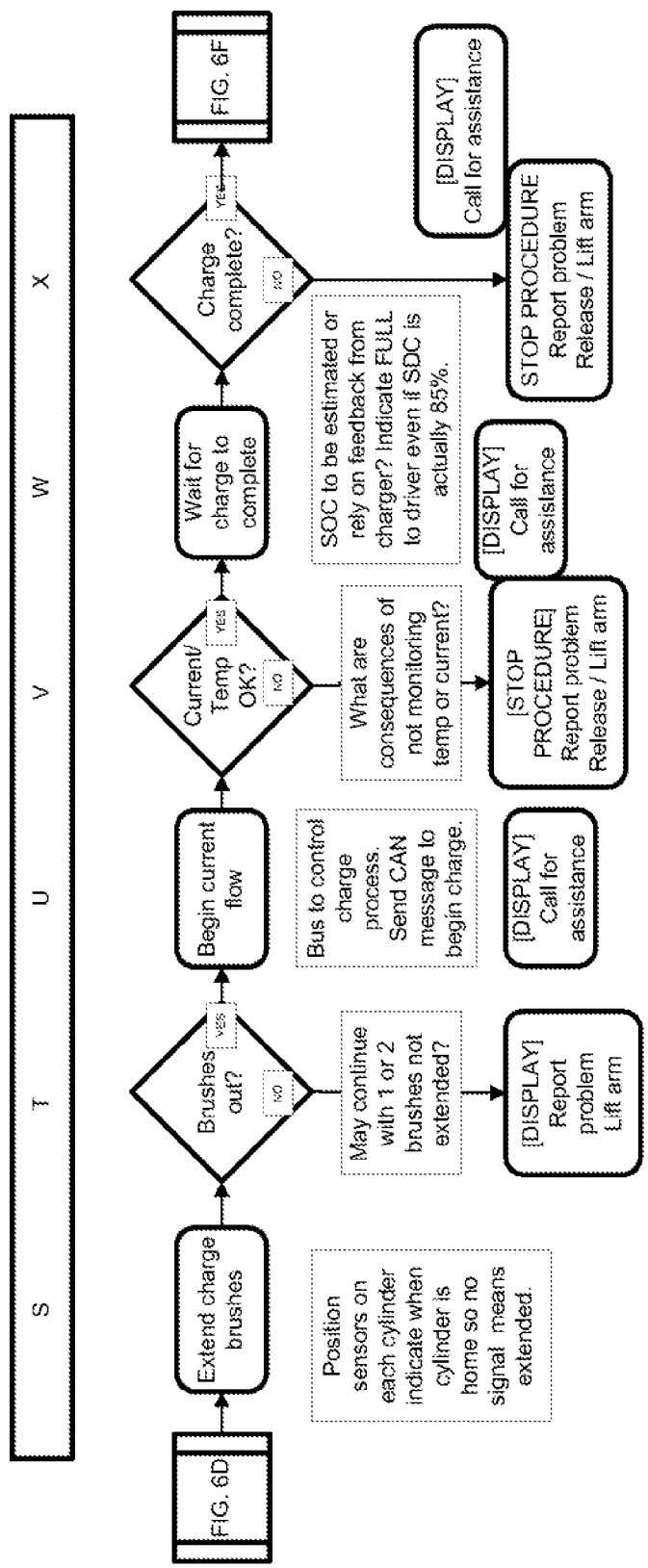

FIGS. 6E and 7E provide an example of steps involved in charging a vehicle. As indicated in step S, during charging, charge brushes may be extended from a charging arm of a charging station. Position sensors may be provided at each cylinder to indicate when a cylinder is home (not extended).

A bus controller may begin a charging sub-routine during charging. It may send a signal to extend a ground brush. It may wait for confirmation or a signal that a ground brush has been extended. It may send an AC signal or tone to ensure that the ground is connected. If the ground is connected, the controller may signal the charge brushes to extend. The charging station controller may provide a signal to extend a grounding brush air cylinder. The charging station controller may also extend charging brush air cylinders.

Step T verifies whether the brushes are out. If they are not all out, but some brushes are out, the procedure may continue with some of the brushes not extended. Continued operation may be at a reduced performance in proportion to number of brushes not extended. If too many of the brushes are not out, an error may be indicated. A display may indicate report the problem. The charging arm may be lifted.

A bus controller may wait for all brushes to extend. In some embodiments, there may be 1 or more, 2 or more, 3 or more, 4 or more, 6 or more, 8 or more, 10 or more, 12 or more, 16 or more, 20 or more, 30 or more, 40 or more, or 50 or more brushes. The controller may wait for all brushes to extend, or may wait for a predetermined number of brushes to extend, As provided in step U, current flow may be initiated. In some embodiments, the bus may control the charge process. The bus may send a CAN message to the charging station to begin the charge. Alternatively, the charging station controller may control the charge process. A bus controller may send a signal to the charging station that it is ok to start charging. The charger may report time to charge.

A controller may determine whether the charging current or temperature falls within a desired range in step V. For example, a desired level of charging may be provided based on the bus battery state of charge, and/or historic/predictive factors. A desired charge characteristic (e.g., voltage, current amplitude, pulsing, duration, etc.) may have a predetermined range. Similarly, a temperature may have a predetermined range. The current and temperature may be monitored periodically or continuously. If they fall outside the desired ranges, a problem may be reported. The charging arm may be released and/or lifted.

Step W may be to wait for the charge to complete. The charge may be applied for a predetermined amount of time. Alternatively, a vehicle state of charge may be monitored, and the charge may occur until the vehicle battery has reached a desired state of charge. In some instances, a display may indicate that the status is charging. The display may also indicate the time left to complete charging or the percent charging that has been completed. Any other status updated may be provided on a display while the bus is charging. A bus controller may stop current flow if there is a loss of pilot, overtemperature indication, based on a report back from a battery management system, or a report back from a charger. A charging station may continuously monitor temperature switches. The charging station may also dose distribution box contactors.

In step X, the system may determine when charge is complete, or that a desired state of charge has been obtained. In some embodiments, the desired state of charge may be when a vehicle battery has been fully charged. Alternatively, the desired state of charge may be any value based on historic/ predictive data for the vehicle. If the charge is not complete after a predetermined amount of time, an error may be reported. The charging arm may be released and/or lifted. A display may indicate to call for assistance.

Figure 6F:
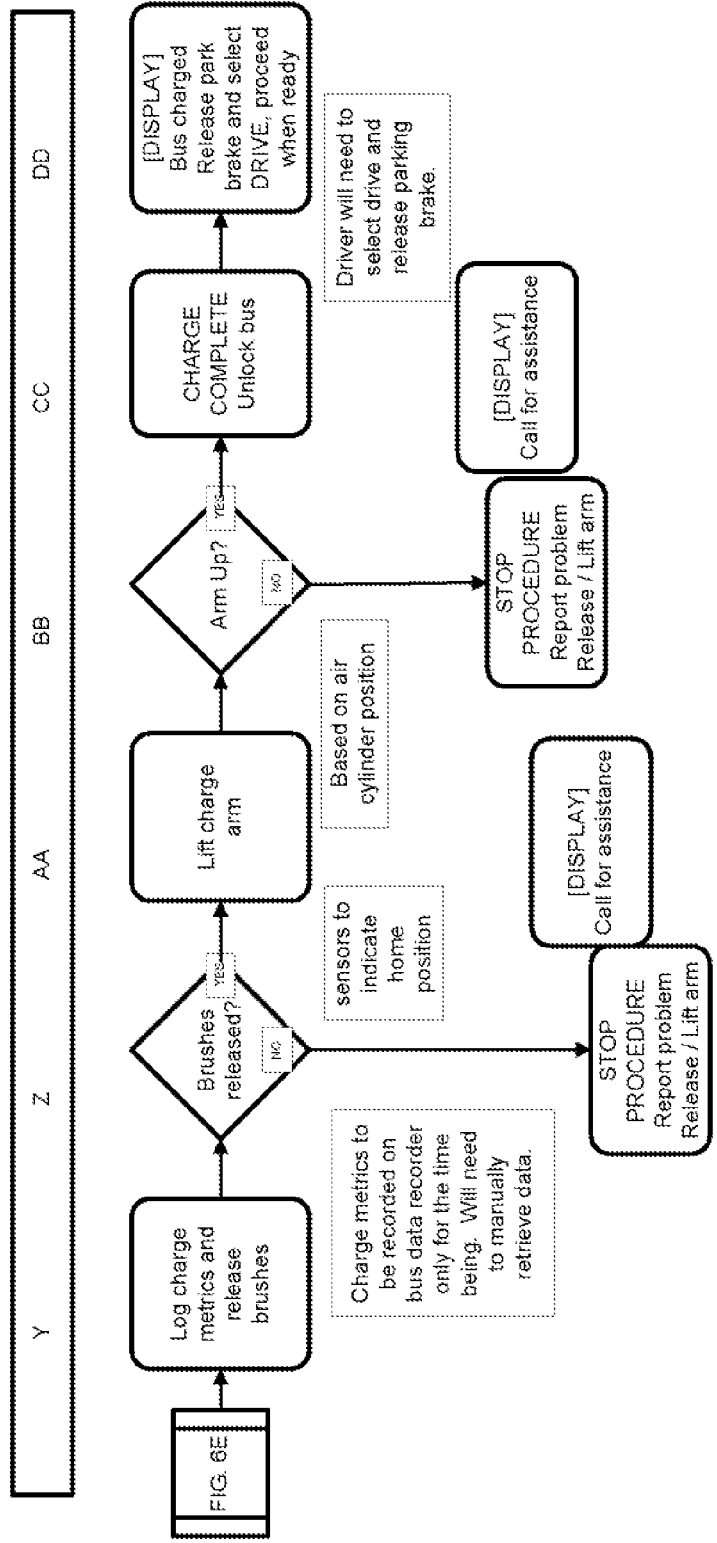

FIGS. 6F and 7F provide an example of steps involved when charging is complete. In step Y, charge metrics may be logged. For example, the initial battery state of charge, the charging parameters (e.g., voltage, current amplitude, duration of charging, total power, faults, time, peak current, etc.), battery end state of charge, may be logged. In some instances, the bus controller may be logging the charge metrics when the charge is complete. In some instances, the charge metrics may be recorded during charge. The charge metrics may be recorded on a bus data recorder. In some embodiments, they may be recorded only for the time being. Alternatively, they may be recorded for an extended amount of time. In some instances, the data may be manually retrieved. Alternatively, the data may be accessible and may be automatically retrieved.

In step Z, a controller may determine whether brushes have been released. If the brushes have not been released the procedure may be stopped. A problem may be reported. If possible, the charging arm may be released and/or lifted. A display may be provided to call for assistance.

A bus controller may begin a charge done sub-routine. Charging may be stopped, and a signal may be provided to release brushes. The controller may wait for all brushes to be released and returned to a retracted (e.g., home) position. A signal may be provided to release ground. In some instances, the controller may wait for the ground to get home. Confirmation may be made that the brushes and ground have been returned to a home position. A signal may be provided to raise the charge arm.

In response to a signal from the bus controller, the charge station may raise the charging arm. In some instances, the charge station controller may ensure that the arm has returned to a home position for the next time.

In accordance with step AA, the charge arm may be lifted. A bus controller may wait for a loss of head micro switches (charge head not down) before allowing a driver to move.

In step BB, the charge arm position may be verified. For example, based on air cylinder position, it may be determined whether a charging arm is up. If not, the procedure may be stopped and/or a problem may be reported. If the arm is successfully up, the bus controller may release a rear-door brake interlock and allow movement.

As indicated in step CC, when charging is complete the bus may be unlocked. A display may indicate to a driver that the charge is complete, and to release a parking brake and select a gear to drive away. As indicated in step DD, when the bus is charged, the parking brake may be released and the driver may select a drive option. The driver may proceed when ready. In some instances, a display may indicate a battery state of charge or a fuel gauge. For example, a full fuel gauge may be displayed.

As previously mentioned any of the steps herein may be provided by one or more controller of the system. One or more bus controller or charging station controller may be provided. Any of the functions, which may be indicated to be performed by a bus controller or charging station controller may be performed by any other controller. In some embodiments, tangible computer readable media may be provided to enable the functions to be carried out. The computer readable media may include logic, code, instructions to carry out such steps.

FIG. 7G provides an example of steps involved in relation to different faults within the system. When a fault is detected, a fault sub-routine may be run. The charger may be signaled to stop. Brushes may be released. The rear-door brake interlock may be released. During a fault, bus movement may be allowed if the driver uses pedals and releases a brake. A signal may be provided to lift the arm up. Any fault code may be logged. A display may be provided indicating that charging has stopped and to contact support. The display may include a number or normal trouble routine.

A display may be provided to a driver and/or operator of a charging station. The display my be provided at a charging station or on a vehicle. The display may be provided on a display device, such as a screen. Some examples of display devices may include whether a particular charging station is ready or not ready (e.g., charging station 1 is ready, charging station 2 is not ready, etc.). The display may also indicate whether communication has been established. The display may also include driving instructions(e.g. please drive slow to 5 mph) before the charge station or auto charging may not take place. Alternatively, the system may take control without providing such instructions. In some instances, a display may indicate the speed of the vehicle (e.g., x.x mph). The speed may be precise. If the speed is acceptable, charging may take place, and the display may indicate as such. In some embodiments, the display may indicate that the driver ought to be prepared to stop if required. The display may also instruct a driver to drive in a manner aligned with a driving guide. In some instances, if the driver strays too much to the left or right a warning may be provided. If the bus is moving too quickly, the display may indicate to the driver to slow down. The display may warn the driver that the vehicle may not charge if it comes in too quickly.

The display may provide instructions for charging the bus. For example, the display may inform the user that to charge the bus, the brake may be released and to pull ahead slowly when safe. The bus may automatically stop. The display may indicate as a driver approaches the initial stop position, and the bus may automatically stop, and to release the brake if safe. The display may also indicate that while waiting for the charge arm to lower, the bus may move ahead automatically to charge, and to release brake if safe. Once a bus is connected to a charger, the display may indicate as such, and instruct the driver to set a parking brake to start the charge and allow the vehicle doors to open. While the bus is charging, the display may indicate the battery state of charge or how much time left to charge. A fault may be indicated if the bus is not charged, and to contact maintenance. When charging is complete, instructions may be provided to select drive and release the parking brake when ready. If the bus is out of position, the display may indicate to drive around and try again (e.g., not back up). In some instances, password access may be granted. A diagnostic screen may be shown indicating battery specifics and fault codes.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method of charging an electric vehicle at a charging station, the electric vehicle including a charging interface positioned on a roof and the charging station including a charging head configured to engage with the charging interface to charge the electric vehicle, comprising:

automatically identifying the electric vehicle as the electric vehicle approaches the charging station;

determining that the approaching electric vehicle is supposed to be charged at the charging station based upon the identification;

automatically controlling a movement of the electric vehicle to position the electric vehicle with the charging interface positioned below the charging head;

lowering the charging head to land on the charging interface based on the identification;

automatically moving the electric vehicle after lowering the charging head to engage the charging head with the charging interface;

automatically stopping the electric vehicle when a pilot signal indicative of the engagement of the charging interface with the charging head is received;

automatically shifting a gear of the electric vehicle to neutral, and applying a brake of the electric vehicle after receipt of the pilot signal;

electrically connecting the charging interface with the charging head; and activating current flow through the charging head to charge the electric vehicle.

2. The method of claim 1, further including raising the charging head from the charging interface after charging is complete.

3. The method of claim 1, further including determining a position of the electric vehicle relative to the charging station as the electric vehicle approaches the charging station.

4. A method of charging an electric vehicle at a charging station, the electric vehicle including a charging interface positioned on a roof and the charging station including a charging head configured to engage with the charging interface to charge the electric vehicle, comprising:

automatically identifying the electric vehicle as the electric vehicle approaches the charging station;

automatically controlling a movement of the electric vehicle to position the electric vehicle with the charging interface positioned below the charging head;

lowering the charging head to land on the charging interface;

automatically moving the electric vehicle after lowering the charging head to engage the charging head with the charging interface;

automatically stopping the electric vehicle when a pilot signal indicative of the engagement of the charging interface with the charging head is received;

automatically shifting a gear of the electric vehicle to neutral, and applying a brake of the electric vehicle after receipt of the pilot signal; and activating current flow through the charging head to charge the electric vehicle.

5. The method of claim 4, wherein lowering the charging head includes detecting whether the charging head has landed in a desired region of the charging interface and raising the charging head from the charging interface if the charging head has not landed on the desired region.

6. A method of charging an electric vehicle at a charging station, the electric vehicle including a charging interface positioned on a roof and the charging station including a charging head configured to engage with the charging interface to charge the electric vehicle, comprising:

automatically identifying the electric vehicle as the electric vehicle approaches the charging station;

automatically controlling a movement of the electric vehicle to position the electric vehicle with the charging interface positioned below the charging head;

detecting features on the roof of the electric vehicle to position the electric vehicle with the charging interface positioned below the charging head;

lowering the charging head to land on the charging interface;

automatically moving the electric vehicle after lowering the charging head to engage the charging head with the charging interface;

automatically stopping the electric vehicle when a pilot signal indicative of the engagement of the charging interface with the charging head is received; and activating current flow through the charging head to charge the electric vehicle.

7. The method of claim 1, wherein automatically moving the electric vehicle includes moving the electric vehicle at a governed speed.

8. The method of claim 1, wherein automatically controlling a movement of the electric vehicle includes limiting a maximum speed of the electric vehicle.

9. The method of claim 4, wherein automatically controlling a movement of the electric vehicle includes limiting a maximum speed of the electric vehicle.

10. The method of claim 4, wherein automatically moving the electric vehicle includes moving the electric vehicle at a governed speed.

11. The method of claim 6, wherein automatically controlling a movement of the electric vehicle includes limiting a maximum speed of the electric vehicle.

12. The method of claim 6, wherein automatically moving the electric vehicle includes moving the electric vehicle at a governed speed.

* * * * *